United States Patent
Tae et al.

(10) Patent No.: US 11,531,793 B2
(45) Date of Patent: Dec. 20, 2022

(54) DEVICE AND METHOD FOR BUILDING LIFE CYCLE SUSTAINABILITY ASSESSMENT USING PROBABILISTIC ANALYSIS METHOD, AND RECORDING MEDIUM STORING THE METHOD

(71) Applicant: INDUSTRY-UNIVERSITY COOPERATION FOUNDATION HANYANG UNIVERSITY ERICA CAMPUS, Ansan-si (KR)

(72) Inventors: Sungho Tae, Ansan-si (KR); Seung Jun Roh, Ansan-si (KR); Rak Hyun Kim, Ansan-si (KR); Hyeong Jae Jang, Seoul (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 513 days.

(21) Appl. No.: 16/306,138

(22) PCT Filed: Jan. 10, 2017

(86) PCT No.: PCT/KR2017/000344
§ 371 (c)(1),
(2) Date: Aug. 21, 2020

(87) PCT Pub. No.: WO2018/124362
PCT Pub. Date: Jul. 5, 2018

(65) Prior Publication Data
US 2020/0380179 A1      Dec. 3, 2020

(30) Foreign Application Priority Data
Jan. 2, 2017   (KR) .................. 10-2017-0000150

(51) Int. Cl.
*G06F 30/17*   (2020.01)
*G06F 30/20*   (2020.01)
(Continued)

(52) U.S. Cl.
CPC .............. *G06F 30/17* (2020.01); *G06F 17/18* (2013.01); *G06F 30/20* (2020.01); *G06N 7/005* (2013.01)

(58) Field of Classification Search
CPC .......... G06F 30/17; G06F 30/20; G06F 17/18; G06N 7/005
See application file for complete search history.

(56) References Cited

U.S. PATENT DOCUMENTS

| | | | |
|---|---|---|---|
| 2010/0057416 A1* | 3/2010 | Peterman | G06F 30/13 703/6 |
| 2010/0223081 A1 | 9/2010 | Espino, Jr. | |
| 2016/0196513 A1* | 7/2016 | Mallon | G06N 7/005 705/7.28 |

FOREIGN PATENT DOCUMENTS

| | | |
|---|---|---|
| KR | 10-2012-0108463 A | 10/2012 |
| KR | 10-1390237 B1 | 4/2014 |

(Continued)

OTHER PUBLICATIONS

Roh S, Tae S, Suk SJ, Ford G, Shin S. Development of a building life cycle carbon emissions assessment program (BEGAS 2.0) for Korea's green building index certification system. Renewable and sustainable energy reviews. Jan. 1, 2016;53:954-65. (Year: 2016).*
Roh S, Tae S, Shin S, Woo J. Development of an optimum design program (SUSB-OPTIMUM) for the life cycle CO2 assessment of an apartment house in Korea. Building and environment. Mar. 1, 2014;73:40-54. (Year: 2014).*

(Continued)

*Primary Examiner* — Chuen-Meei Gan
(74) *Attorney, Agent, or Firm* — Sughrue Mion, PLLC

(57) ABSTRACT

A device and method for building life cycle sustainability assessment using probabilistic analysis method, the device and method being capable of assessing and predicting building life cycle sustainability, and a recording medium storing (Continued)

the method. The device includes: a first storage unit storing a reference environmental impact assessment value of a reference building, and first and second environmental impact coefficient groups; an input unit receiving area information, amounts of building materials and energy sources; a probability distribution calculating unit storing a set value, and deducing probability distributions of the building materials and the energy sources; a first arithmetic unit calculating probability distributions of first and second environmental impact assessment values, and a probability distribution of a life cycle environmental impact assessment value; and a first output unit deducing a probability distribution of an environmental impact index, and outputting the deduced probability distribution of the environmental impact index.

9 Claims, 21 Drawing Sheets

(51) Int. Cl.
  G06F 17/18 (2006.01)
  G06N 7/00 (2006.01)

(56) References Cited

FOREIGN PATENT DOCUMENTS

| KR | 10-1414282 B1 | 7/2014 |
| KR | 10-1472461 B1 | 12/2014 |
| KR | 10-1642225 B1 | 8/2016 |
| WO | 2015/012499 A1 | 1/2015 |

OTHER PUBLICATIONS

Lee K, Tae S, Shin S. Development of a life cycle assessment program for building (SUSB-LCA) in South Korea. Renewable and Sustainable Energy Reviews. Oct. 1, 2009;13(8):1994-2002. (Year: 2009).*

Hong, Tae-Hoon et al., "Environmental Impact Assessment of Buildings based on Life Cycle Assessment (LCA) Methodology", KJCEM, Sep. 30, 2012, pp. 84-93, vol. 13, No. 5.

Seung Jun Roh, "Life Cycle Sustainability Assessment Model of Buildings using Probabilistic Analysis Method", Thesis for the degree of Doctor of Philosophy, Feb. 2016.

International Search Report of PCT/KR2017/000344 dated Sep. 29, 2017 [PCT/ISA/210].

Written Opinion of PCT/KR2017/000344 dated Sep. 29, 2017 [PCT/ISA/237].

* cited by examiner

FIG. 10

| Classification | | PDF-01 | PDF-02 | PDF-03 | PDF-04 | PDF-05 |
|---|---|---|---|---|---|---|
| Materials | | Ready mixed concrete | Ready mixed concrete | Ready mixed concrete | Ready mixed concrete | Ready mixed concrete |
| Subject | Building | Apartment building | Apartment building | Apartment building | Apartment building | Apartment building |
| | Structure | Wall structure | Wall structure | Wall structure | Rigid structure | Rigid structure |
| | Plan type | Plate-type | Tower-type | Mixed-type | Plate-type | Tower-type |
| Probability distribution (Probability on Y-axis of graphs) | | 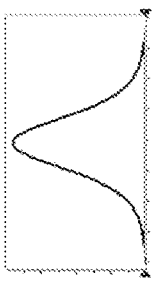 | 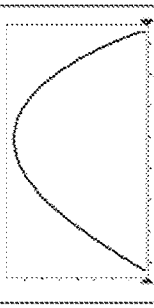 |  |  | 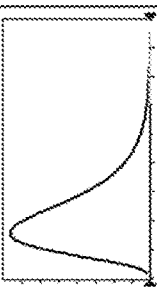 |
| | | Lognormal distribution | Weibull distribution | Gamma distribution | Beta distribution | Logistic distribution |
| A-D test value | | 0.807 | 0.544 | 0.428 | 0.192 | 1.139 |
| Number of samples | | 118 | 101 | 60 | 22 | 40 |
| Correlation variable | | Dwelling exclusive area | Dwelling exclusive area | Dwelling exclusive area | Dwelling exclusive area | Dwelling exclusive area |
| Unit | | $m^3/m^2$ | $m^3/m^2$ | $m^3/m^2$ | $m^3/m^2$ | $m^3/m^2$ |
| Mean | | 0.77 $m^3/m^2$ | 0.73 $m^3/m^2$ | 0.75 $m^3/m^2$ | 0.71 $m^3/m^2$ | 0.60 $m^3/m^2$ |
| Median | | 0.76 $m^3/m^2$ | 0.74 $m^3/m^2$ | 0.74 $m^3/m^2$ | 0.71 $m^3/m^2$ | 0.60 $m^3/m^2$ |
| Mode | | 0.74 $m^3/m^2$ | 0.74 $m^3/m^2$ | 0.72 $m^3/m^2$ | 0.72 $m^3/m^2$ | 0.60 $m^3/m^2$ |

FIG. 11

| Classification | | PDF-06 | PDF-07 | PDF-08 | PDF-09 | PDF-10 |
|---|---|---|---|---|---|---|
| Materials | | Ready mixed concrete | Ready mixed concrete | Rebar | Rebar | Rebar |
| Subject | Building | Apartment building | Apartment building | Apartment building | Apartment building | Apartment building |
| | Structure | Rigid structure | Flat plate structure | Wall structure | Wall structure | Wall structure |
| | Plan type | Mixed-type | All types | Plate-type | Tower-type | Mixed-type |
| Probability distribution (Probability on Y-axis of graphs) | | 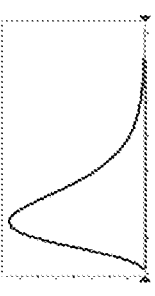 | 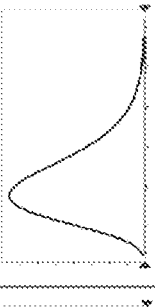 | 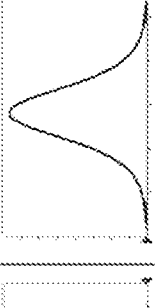 | 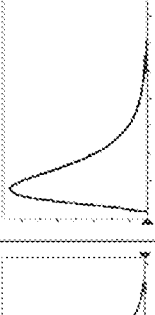 |  |
| | | Logistic distribution | Lognormal distribution | Logistic distribution | Lognormal distribution | Lognormal distribution |
| A-D test value | | 0.654 | 0.351 | 0.727 | 0.432 | 0.404 |
| Number of samples | | 64 | 38 | 118 | 101 | 60 |
| Correlation variable | | Dwelling exclusive area | Dwelling exclusive area | Dwelling exclusive area | Dwelling exclusive area | Dwelling exclusive area |
| Unit | | $m^3/m^2$ | $m^3/m^2$ | $kg/m^2$ | $kg/m^2$ | $kg/m^2$ |
| Mean | | 0.78 $m^3/m^2$ | 0.64 $m^3/m^2$ | 98.13 $kg/m^2$ | 101.35 $kg/m^2$ | 99.92 $kg/m^2$ |
| Median | | 0.78 $m^3/m^2$ | 0.61 $m^3/m^2$ | 98.13 $kg/m^2$ | 100.07 $kg/m^2$ | 98.14 $kg/m^2$ |
| Mode | | 0.78 $m^3/m^2$ | 0.57 $m^3/m^2$ | 98.13 $kg/m^2$ | 97.68 $kg/m^2$ | 94.94 $kg/m^2$ |

FIG. 12

| Classification | | PDF-11 | PDF-12 | PDF-13 | PDF-14 | PDF-15 |
|---|---|---|---|---|---|---|
| Materials | | Rebar | Rebar | Rebar | Rebar | Concrete brick |
| Subject | Building | Apartment building | Apartment building | Apartment building | Apartment building | Apartment building |
| | Structure | Rigid structure | Rigid structure | Rigid structure | Plat plate structure | All structures |
| | Plan type | Plate-type | Tower-type | Mixed-type | All types | Plate-type |
| Probability distribution (Probability on Y-axis of graphs) | | 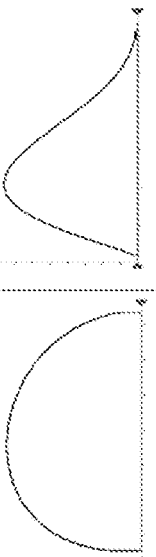 | 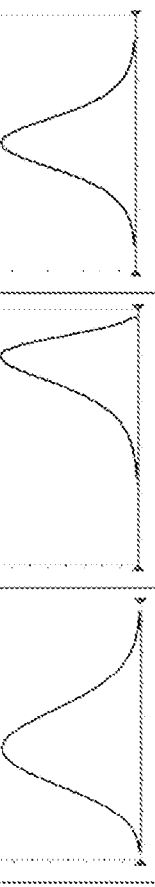 | 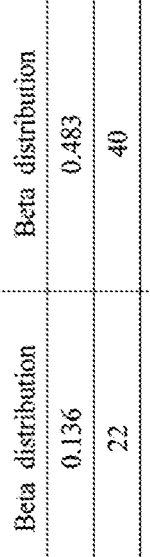 | 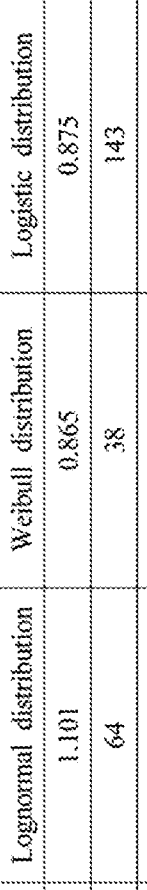 | 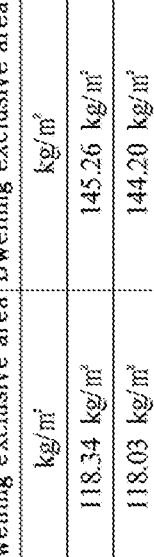 |
| | | Beta distribution | Beta distribution | Lognormal distribution | Weibull distribution | Logistic distribution |
| A-D test value | | 0.136 | 0.483 | 1.101 | 0.865 | 0.875 |
| Number of samples | | 22 | 40 | 64 | 38 | 143 |
| Correlation variable | | Dwelling exclusive area | Dwelling exclusive area | Dwelling exclusive area | Dwelling exclusive area | Dwelling exclusive area |
| Unit | | kg/m² | kg/m² | kg/m² | kg/m² | each/m² |
| Mean | | 118.34 kg/m² | 145.26 kg/m² | 131.55 kg/m² | 153.81 kg/m² | 45.33 each/m² |
| Median | | 118.03 kg/m² | 144.20 kg/m² | 131.01 kg/m² | 155.82 kg/m² | 45.33 each/m² |
| Mode | | 115.64 kg/m² | 140.98 kg/m² | 129.95 kg/m² | 159.31 kg/m² | 45.33 each/m² |

FIG. 13

| Classification | | PDF-16 | PDF-17 | PDF-18 | PDF-19 | PDF-20 |
|---|---|---|---|---|---|---|
| Materials | | Concrete brick | Concrete brick | Gypsum board | Gypsum board | Gypsum board |
| Subject | Building Structure | Apartment building | Apartment building | Apartment building | Apartment building | Apartment building |
| | | All structures | All structures | All structures | All structures | All structures |
| | Plan type | Tower-type | Mixed-type | Plate-type | Tower-type | Mixed-type |
| Probability distribution (Probability on Y-axis of graphs) | | 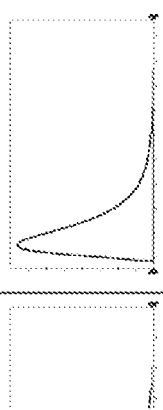 | 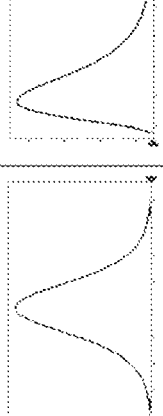 | 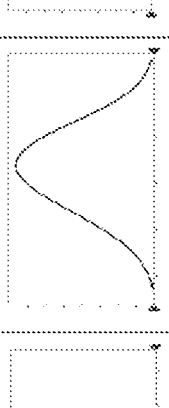 | 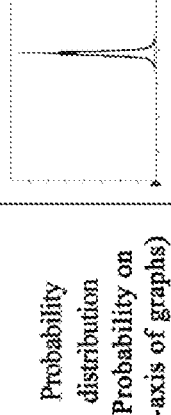 |  |
| | | Student's t distribution | Weibull distribution | Logistic distribution | Lognormal distribution | Lognormal distribution |
| A-D test value | | 0.669 | 0.781 | 0.635 | 0.721 | 0.569 |
| Number of samples | | 167 | 133 | 143 | 167 | 133 |
| Correlation variable | | Dwelling exclusive area | Dwelling exclusive area | Dwelling exclusive area | Dwelling exclusive area | Dwelling exclusive area |
| Unit | | each/m² | each/m² | kg/m² | kg/m² | kg/m² |
| Mean | | 44.85 each/m² | 42.91 each/m² | 2.61 kg/m² | 2.69 kg/m² | 2.65 kg/m² |
| Median | | 44.85 each/m² | 43.11 each/m² | 2.61 kg/m² | 2.65 kg/m² | 2.59 kg/m² |
| Mode | | 44.85 each/m² | 43.71 each/m² | 2.61 kg/m² | 2.57 kg/m² | 2.50 kg/m² |

FIG. 14

| Classification | PDF-21 | PDF-22 | PDF-23 | PDF-24 | PDF-25 |
|---|---|---|---|---|---|
| Materials | Window frame | Stone | Tile | Glass | Insulation |
| Subject - Building | Apartment building | Apartment building | Apartment building | Apartment building | Apartment building |
| Subject - Structure | All structures | All structures | All structures | All structures | All structures |
| Subject - Plan type | All types | All types | All types | All types | All types |
| Probability distribution (Probability on Y-axis of graphs) |  | 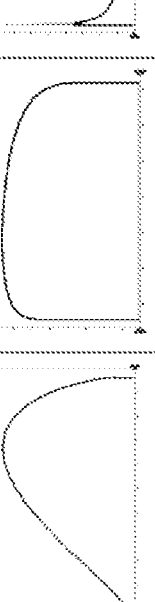 | 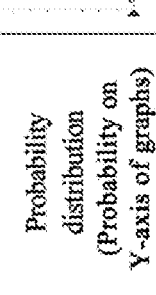 | 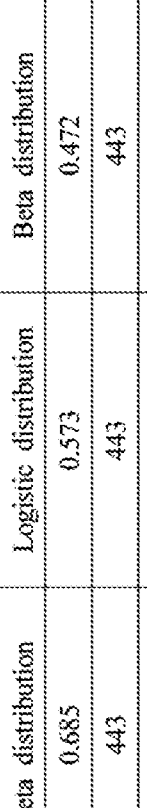 | 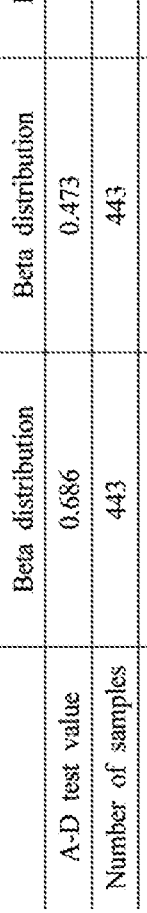 |
| | Beta distribution | Beta distribution | Beta distribution | Logistic distribution | Beta distribution |
| A-D test value | 0.686 | 0.473 | 0.685 | 0.573 | 0.472 |
| Number of samples | 443 | 443 | 443 | 443 | 443 |
| Correlation variable | Dwelling exclusive area | Dwelling exclusive area | Dwelling exclusive area | Dwelling exclusive area | Dwelling exclusive area |
| Unit | $kg/m^2$ | $m^2/m^2$ | $m^2/m^2$ | $m^2/m^2$ | $kg/m^2$ |
| Mean | 5.76 $kg/m^2$ | 0.14 $m^2/m^2$ | 0.56 $m^2/m^2$ | 0.46 $kg/m^2$ | 1.48 $kg/m^2$ |
| Median | 5.78 $kg/m^2$ | 0.14 $m^2/m^2$ | 0.55 $m^2/m^2$ | 0.46 $kg/m^2$ | 1.44 $kg/m^2$ |
| Mode | 5.87 $kg/m^2$ | 0.13 $m^2/m^2$ | 0.54 $m^2/m^2$ | 0.46 $kg/m^2$ | 1.34 $kg/m^2$ |

FIG. 15

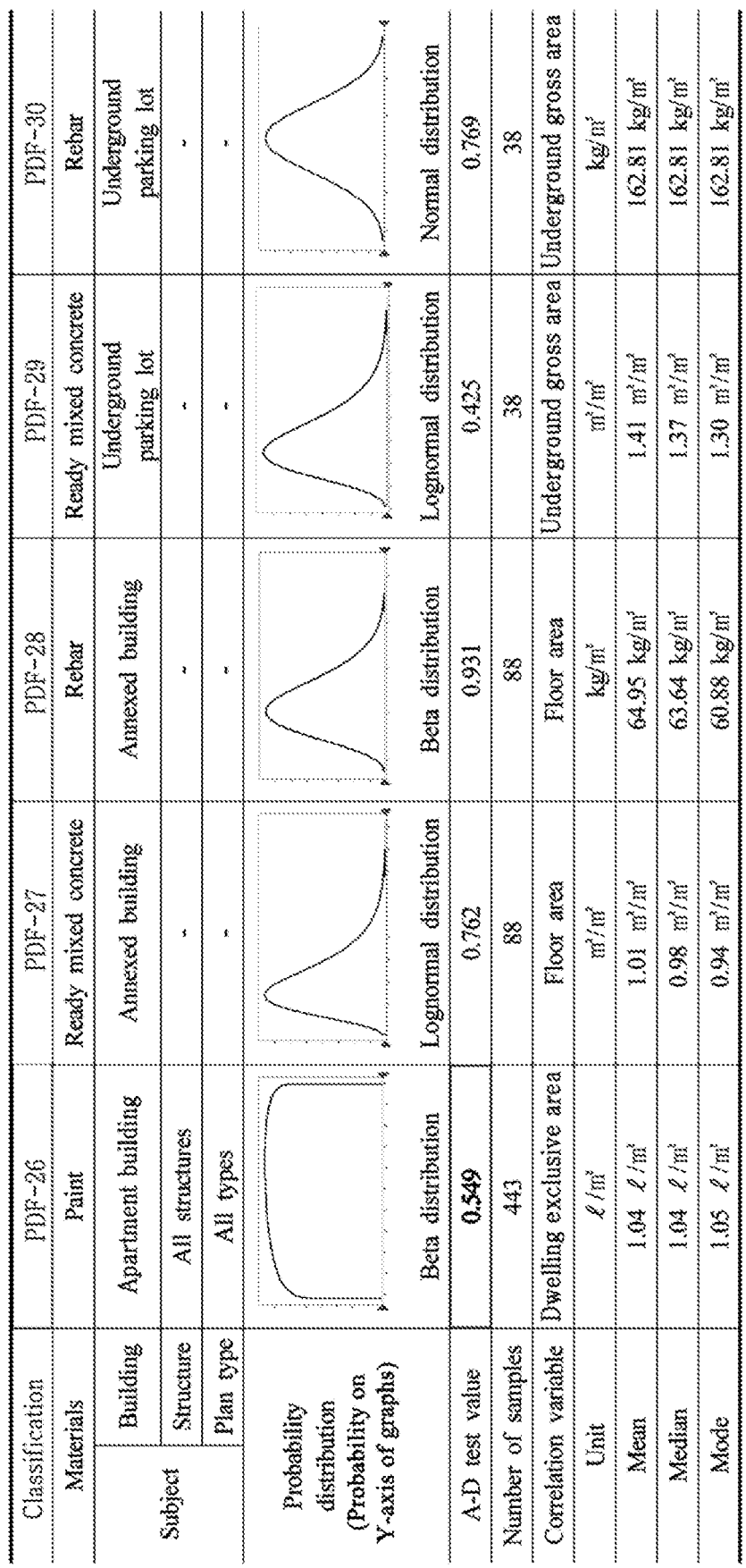

| Classification | | PDF-26 | PDF-27 | PDF-28 | PDF-29 | PDF-30 |
|---|---|---|---|---|---|---|
| Materials | | Paint | Ready mixed concrete | Rebar | Ready mixed concrete | Rebar |
| Subject | Building | Apartment building | Annexed building | Annexed building | Underground parking lot | Underground parking lot |
| | Structure | All structures | - | - | - | - |
| | Plan type | All types | - | - | - | - |
| Probability distribution (Probability on Y-axis of graphs) | | | | | | |
| | | Beta distribution | Lognormal distribution | Beta distribution | Lognormal distribution | Normal distribution |
| A-D test value | | 0.549 | 0.762 | 0.931 | 0.425 | 0.769 |
| Number of samples | | 443 | 88 | 88 | 38 | 38 |
| Correlation variable | | Dwelling exclusive area | Floor area | Floor area | Underground gross area | Underground gross area |
| Unit | | $\ell/m^2$ | $m^3/m^2$ | $kg/m^2$ | $m^3/m^2$ | $kg/m^2$ |
| Mean | | 1.04 $\ell/m^2$ | 1.01 $m^3/m^2$ | 64.95 $kg/m^2$ | 1.41 $m^3/m^2$ | 162.81 $kg/m^2$ |
| Median | | 1.04 $\ell/m^2$ | 0.98 $m^3/m^2$ | 63.64 $kg/m^2$ | 1.37 $m^3/m^2$ | 162.81 $kg/m^2$ |
| Mode | | 1.05 $\ell/m^2$ | 0.94 $m^3/m^2$ | 60.88 $kg/m^2$ | 1.30 $m^3/m^2$ | 162.81 $kg/m^2$ |

FIG. 16

| Building materials | LCI DB | Source | Functional Unit | Environmental impact categories | | | | | |
|---|---|---|---|---|---|---|---|---|---|
| | | | | GWP (kg-$CO_{2eq}$/FU) | AP (kg-$SO_{2eq}$/FU) | EP (kg-$PO_4^{3-}{}_{eq}$/FU) | ODP (kg-$CFC-11_{eq}$/FU) | POCP (kg-$C_2H_{4eq}$/FU) | ADP (kg-$Sb_{eq}$/FU) |
| Ready mixed concrete | Ready mixed concrete 25-210-12 | A | $m^3$ | 4.09E+02 | 6.81E-01 | 7.96E-02 | 4.65 E-05 | 1.02E+00 | 1.55E+00 |
| | Ready mixed concrete 25-210-15 | A | $m^3$ | 4.19E+02 | 6.94E-01 | 8.08E-02 | 4.61 E-05 | 1.13E+00 | 1.56E+00 |
| | Ready mixed concrete 25-240-12 | A | $m^3$ | 4.14E+02 | 6.79E-01 | 8.12E-02 | 4.34 E-05 | 1.07E+00 | 1.96E+00 |
| | Ready mixed concrete 25-240-15 | A | $m^3$ | 4.29E+02 | 7.05E-01 | 8.20E-02 | 4.59 E-05 | 1.15E+00 | 2.08E+00 |
| Rebar | Electric steel deformed bars | A | kg | 4.38E-01 | 1.40E-03 | 1.79E-04 | 1.04E-08 | 3.41 E-04 | 2.79E-03 |
| Steel frame | Channel | B | kg | 4.04E-01 | 6.47E-04 | 1.17E-04 | 2.26 E-08 | 2.93 E-04 | 1.12E-03 |
| | I-Beam | B | kg | 4.03E-01 | 6.38E-04 | 1.16E-04 | 2.26 E-08 | 2.92E-04 | 1.12E-03 |
| | H-Beam | B | kg | 3.97E-01 | 6.34E-04 | 1.15E-04 | 2.25 E-08 | 2.91E-04 | 1.11E-03 |
| Paint | Paint_emulsion type | A | kg | 3.23E-01 | 1.13E-03 | 9.53E-05 | 8.51 E-08 | 4.05 E-04 | 6.49E-03 |
| | Paint_water type | A | kg | 1.19E+00 | 7.62E-03 | 9.99E-04 | 2.71 E-08 | 4.04 E-04 | 1.48E-02 |
| | Paint_aminoalkyd type | A | kg | 8.37E-01 | 3.77E-03 | 1.83E-03 | 4.06 E-08 | 3.65 E-04 | 1.80E-02 |
| | Paint_acryl type | A | kg | 9.12E-01 | 4.91E-03 | 5.40E-04 | 3.56 E-08 | 4.04 E-04 | 4.36E-02 |
| | Paint_epoxy type | A | kg | 3.54E+00 | 2.23E-02 | 2.87E-03 | 3.06E-08 | 9.48 E-04 | 2.64E-02 |
| Glass | Plate glass | A | kg | 7.89E-01 | 5.50E-03 | 3.93E-04 | 3.04E-07 | 1.06 E-03 | 7.88E-03 |
| | Insulating glass | B | $m^2$ | 2.24E+01 | 3.05E-02 | 2.21E-03 | 1.81 E-07 | 5.39E-02 | 9.13E-02 |
| | Tempered glass | B | $m^2$ | 1.34E+01 | 2.57E-02 | 4.05E-03 | 6.64 E-08 | 2.32E-02 | 1.08E-01 |
| Cement | Cement | A | kg | 1.06E+00 | 1.30E-03 | 1.86E-04 | 3.55 E-08 | 3.03 E-04 | 1.13E-03 |
| | Portland cement type I | A | kg | 9.48E-01 | 1.28E-03 | 1.35E-04 | 1.70 E-08 | 2.60E-03 | 7.36E-04 |
| | Portland cement type II | A | kg | 9.49E-01 | 1.12E-03 | 9.71E-05 | 1.39 E-09 | 1.74 E-04 | 1.52E-03 |
| | Portland cement type III | A | kg | 9.36E-01 | 5.83E-04 | 3.71E-06 | 1.25 E-09 | 1.66 E-04 | 6.58E-04 |
| | Portland cement type V | A | kg | 9.43E-01 | 5.19E-04 | 9.45E-05 | 1.28 E-09 | 1.42 E-04 | 6.64E-04 |
| | Blast furnace slag cement | A | kg | 2.05E-01 | 5.51E-04 | 6.70E-05 | 4.14 E-09 | 5.00E-04 | 1.91E-04 |
| Insulation | Expanded polystyrene panel | B | kg | 2.06E+00 | 4.05E-02 | 2.77E-03 | 2.89 E-08 | 6.39E-03 | 1.74E-01 |
| Gypsum board | Gypsum board | A | kg | 2.15E-01 | 7.82E-04 | 1.32E-04 | 1.42 E-08 | 1.90E-04 | 1.09E-03 |

FIG. 17

| Environmental impact categories | Reference material | Safety guard | End point | | Indicator | Damage factor |
|---|---|---|---|---|---|---|
| GWP | $CO_2$ | Human health | Heat/cold stress | Death damage due to heat / cold stress | Lost life | $1.23 \times 10^{-7}$ DALY/kg-$CO_2$ |
| | | | Infections | Damage caused by Malaria/Dengue fever | | |
| | | | Disaster damage | Death damage due to flood/typhoon increase | | |
| | | | Malnutrition | Death damage due to malnutrition | | |
| | | Social assets | Agricultural production | Reduction in potential production output | Agricultural production output | $2.72_{WON}$/kg-$CO_2$ |
| | | | Energy consumption | Change in energy consumption due to increase in cooling and decrease in heating | Energy consumption quantity | |
| | | | Sea-level rising | Submersion damage | Land price | |
| AP | $SO_2$ | Human health | Respiratory diseases | Damage due to asthma/respiratory diseases | Lost life | $2.38 \times 10^{-4}$ DALY/kg-$SO_2$ |
| | | Social assets | Wood production | Reduction in potential production output | Wood production output | $5,094.81_{WON}$/kg-$SO_2$ |
| | | Primary production | Terrestrial ecosystem | Decrease in primary production of land plants | Primary production output | 26.26 kg/kg-$SO_2$ |
| EP | $PO_4^{3-}$ | Social assets | Water-ecosystem | Fishery production output decrease | Fishery production output | $2,314.00_{WON}$/kg-$PO_4^{3-}$ |
| | | Human health | Skin cancer | Damage due to malignant melanoma, basal cell carcinoma, spinocellular carcinoma | Lost life | $1.35 \times 10^{-3}$ DALY/kg-CFC-11 |
| | | | Cataract | Cortical/ nuclear cataract damage | | |
| ODP | CFC-11 | Social assets | Agricultural production | Reduction in potential production output | Agricultural, Wood production output | $1,295.43_{WON}$/kg-CFC-11 |
| | | | Wood production | Reduction in potential production outp | | |
| | | Primary production | Terrestrial ecosystem | Decrease in primary production of land plants | Primary production output | 279.48 kg/kg-CFC-11 |
| | | | Water-ecosystem | Decrease in primary production output of phytoplankton | | |
| POCP | $C_2H_4$ | Human health | Respiratory diseases | Damage due to acute death, asthma, respiratory illness, etc. | Lost life | $3.22 \times 10^{-5}$ DALY/kg-$C_2H_4$ |
| | | Social assets | Agricultural production | Reduction in potential production output | Agricultural production output | $828.30_{WON}$/kg-$C_2H_4$ |
| | | | Wood production | Reduction in potential production output | Wood production output | |
| | | Primary production | Terrestrial ecosystem | Decrease in primary production of land plants | Primary production output | 26.40 kg/kg-$C_2H_4$ |
| ADP | Sb | Social assets | Exhaustible resource | Reduction in resource reserves | Users' costs | 14.21 kg/kg-Sb |
| | | Biodiversity | Terrestrial ecosystem | Changes in composition of plant species | Change in species | $1.53 \times 10^{-1}$ EINES/kg-Sb |
| | | Primary production | Terrestrial ecosystem | Land change and potential NPP degradation in land | Primary production output | $8.90 \times 10^{-14}$ kg/kg-Sb |

FIG. 18

| Social topics | | Criteria | Workplace A | Workplace B | Workplace C | Workplace D | Weighted average |
|---|---|---|---|---|---|---|---|
| Freedom of association and collective bargaining | +2 | For legally defined labor union activities, workers can freely choose the content to be notified in advance, the company does not discipline collective bargaining and negotiation of workers, group behavior. | | | | | |
| | +1 | Workers are not hindered in their attempts to exercise their right to organize labor union and bargain collectively and worker representatives do not face disciplinary action. In addition, workers are pro-actively informed about their right to organize labor union and bargain collectively and that their doing so will not result in disciplinary action | | | | | |
| | 0 | Workers are not hindered in their attempts to exercise their right to organize labor union and bargain collectively and worker representatives do not face disciplinary action. | -2 | -2 | 0 | +2 | -0.36 |
| | -1 | Workers are hindered in their attempts to exercise their right to organize labor union and bargain collectively or worker representatives face disciplinary action. | | | | | |
| | -2 | The labor union for exercising workers' right does not exist, or workers are hindered in their attempts to exercise their right to organize labor union and bargain collectively and worker representatives face disciplinary action | | | | | |
| Child labour | +2 | Policies against child labor, a compliance management process exist and proof-of-age records are documented. In addition, employers and suppliers are pro-actively monitored to prevent child labor. | | | | | |
| | +1 | Policies against child labor, a compliance management process exist and proof-of-age records are documented. In addition, employers are pro-actively monitored to avoid child labor. | | | | | |
| | 0 | Policies against child labor and a compliance management process exist, and proof-of-age records are documented | +2 | +2 | +2 | +2 | +2.00 |
| | -1 | Policies against child labor, a compliance management process exist but no proof-of-age records are documented. | | | | | |
| | -2 | No policy against child labor, no compliance management process and no proof-of-age records exist. | | | | | |
| Fair salary | +2 | All workers are paid at least the legal minimum wage, with at least 25% of workers paid an additional living allowance. | | | | | |
| | +1 | All workers are paid at least the legal minimum wage, with less than 25% of workers paid an additional living allowance. | | | | | |
| | 0 | All workers are paid the legal minimum wage. | 0 | +2 | +2 | +2 | +1.70 |
| | -1 | Less than 25% of workers paid below legal minimum wage. | | | | | |
| | -2 | Not less than 25% of workers paid below legal minimum wage. | | | | | |

FIG. 19

| Social topics | | Criteria | Workplace | | | | Weighted average |
|---|---|---|---|---|---|---|---|
| | | | A | B | C | D | |
| Working hours | +2 | Normal working week does not exceed legal standard of 40 hours. Overtime is recorded and done in a voluntary atmosphere, does not exceed 12 hours per week, and provided with an extra overtime allowance. | | | | | |
| | +1 | Normal working week does not exceed legal standard of 40 hours and overtime is recorded and done in a voluntary atmosphere. However, overtime hours is over 12 hours per week or no overtime allowance is paid. | | | | | |
| | 0 | Normal working week does not exceed legal standard of 40 hours and overtime is recorded and done in a voluntary atmosphere. However, overtime hours is over 12 hours per week and no overtime allowance is paid. | -2 | -1 | -1 | -1 | -1.15 |
| | -1 | The working hours per week of high season exceed legal standard of 40 hours except for normal working week, and overtime is not recorded. | | | | | |
| | -2 | Normal working week exceeds legal standard of 40 hours. Overtime is not recorded. | | | | | |
| Forced labour | +2 | The company does not retain workers' documents and/or salary, and workers are employed under reasonable terms and conditions which include their right to early retirement. In addition, employers and suppliers endeavor to prevent forced labor. | | | | | |
| | +1 | The company does not retain workers' documents and/or salary, and workers are employed under reasonable terms and conditions which include their right to early retirement. In addition, employers endeavor to prevent forced labor. | | | | | |
| | 0 | The company does not retain workers' documents and/or salary, and workers are employed under reasonable terms and conditions which include their right to early retirement. | +2 | +2 | +2 | +2 | +2.00 |
| | -1 | The company does not retain workers' documents and/or salary. However, workers are not employed under reasonable terms and conditions which include their right to early retirement. | | | | | |
| | -2 | The company compels workers to submit documents and/or salary, and workers are not employed under reasonable terms and conditions which include their right to early retirement. | | | | | |

FIG. 20

| Social topics | | Criteria | Workplace | | | | Weighted average |
|---|---|---|---|---|---|---|---|
| | | | A | B | C | D | |
| Equal opportunities / discrimination | +2 | Complaint procedure operational, equal pay for work of equal value and goals for staff diversity are achieved | | | | | |
| | +1 | Complaint procedure operational, equal pay for work of equal value and goals for staff diversity are set | | | | | |
| | 0 | Complaint procedure operational, equal pay for work of equal value but no goals for staff diversity are set. | +2 | +2 | +2 | +2 | +2.00 |
| | -1 | Complaint procedure operational but unequal pay for work of equal value and no goals for staff diversity are set. | | | | | |
| | -2 | No complaint procedure operational, unequal pay for work of equal value and no goals for staff diversity are set. | | | | | |
| Health and safety | +2 | Education on health and safety is provided, and duties and lines of responsibility for health and safety are defined. Workers design, develop and examine educational programs for health and safety. The disaster level was established and a reduction goal for the same is established. | | | | | |
| | +1 | Education on health and safety is provided, and duties and lines of responsibility for health and safety are defined. Workers design, develop and examine educational programs for health and safety. | | | | | |
| | 0 | Education on health and safety Is provided, and duties and lines of responsibility for health and safety are defined | 0 | 0 | 0 | 0 | 0.00 |
| | -1 | Education on health and safety is not provided, or duties and lines of responsibility for health and safety are not defined | | | | | |
| | -2 | Education on health and safety is neither provided, nor are duties and lines of responsibility for health and safety defined. | | | | | |

FIG. 21

| Social topics | | Criteria | Workplace | | | | Weighted average |
|---|---|---|---|---|---|---|---|
| | | | A | B | C | D | |
| Social benefits / Social security | +2 | All workers are granted social benefits of legal standards and additional benefits are granted to at least 25% of workers | 0 | | | | +1.70 |
| | +1 | All workers are granted social benefits of legal standards and additional benefits are granted to less than 25% of workers | | | | | |
| | 0 | All workers are granted social benefits of legal standards | | +2 | +2 | +2 | |
| | -1 | Social benefits of legal standards are not granted to less than 25% of workers | | | | | |
| | -2 | Social benefits of legal standards are not granted to not less than 25% of workers | | | | | |
| Training and education | +2 | Periodic training and education is implemented to all workers. | | | | | +1.54 |
| | +1 | Intermittent training and education is implemented to more than 75% of workers. | -1 | | | | |
| | 0 | Intermittent training and education is implemented to 50% to 75% of workers. | | +2 | +2 | +2 | |
| | -1 | Intermittent training and education is implemented to less than 50% of workers. | | | | | |
| | -2 | Training and education is not implemented. | | | | | |
| Employment and employment relationships | +2 | Labor contracts are written for all workers and at least 25% of workers are employed as regular workers. | +2 | +2 | +2 | +2 | +2.00 |
| | +1 | Labor contracts are written for all workers and less than 25% of workers are employed as regular workers. | | | | | |
| | 0 | Labor contracts are written for all workers but all workers are employed as irregular workers. | | | | | |
| | -1 | Labor contracts are not written for less than 25% of workers. | | | | | |
| | -2 | Labor contracts are not written for not less than 25% of workers. | | | | | |
| Job satisfaction | +2 | Annual turnover rate of workers is less than 5%. | | | | | +0.84 |
| | +1 | Annual turnover rate of workers is more than or equal to 5% and less than 10%. | -1 | 0 | +2 | +2 | |
| | 0 | Annual turnover rate of workers is more than or equal to 10% and less than 15%. | | | | | |
| | -1 | Annual turnover rate of workers is more than or equal to 15% and less than 20%. | | | | | |
| | -2 | Annual turnover rate of workers is more than or equal to 20%. | | | | | |

DEVICE AND METHOD FOR BUILDING LIFE CYCLE SUSTAINABILITY ASSESSMENT USING PROBABILISTIC ANALYSIS METHOD, AND RECORDING MEDIUM STORING THE METHOD

CROSS REFERENCE TO RELATED APPLICATIONS

This application is a National Stage of International Application No. PCT/KR2017/000344, filed Jan. 10, 2017, claiming priority based on Korean Patent Application No. 10-2017-0000150, filed Jan. 2, 2017.

This invention was financially supported by the below-identified R&D projects.

1. Project Serial Number: 2015R1A5A1037548
    1) Managing organization: Ministry of Science and ICT of Korea
    2) Supporting organization: National Research Foundation of Korea
    3) Research Project: Science and Engineering Fundamental Research Project/Leading Research Center Support Project/Engineering Research Center (ERC)
    4) Research Task: Innovative Durable Building and Infrastructure Research Center
    5) Percent contribution: 40%
    6) Executing organization: Industry-University Cooperation Foundation Hanyang University ERICA Campus
    7) Project Period: Aug. 1, 2015-Feb. 28, 2019
2. Project Serial Number: 16CTAP-C114806-01
    1) Managing organization: Ministry of Land, Infrastructure, and Transport of Korea
    2) Supporting organization: Ministry of Land, Infrastructure, and Transport of Korea
    3) Research Project: Land, Infrastructure and Transport Technology Research and Development Project/Land, Infrastructure and Transport Technology Research and Development Promotion Project
    4) Research Task: Development of Probability-based Evaluation Technology on Sustainability of Multi-dwelling Units
    5) Percent contribution: 30%
    6) Executing organization: Industry-University Cooperation Foundation Hanyang University ERICA Campus
    7) Project Period: Jun. 22, 2016-Jun. 21, 2018
3. Project Serial Number: 2015R1D1A1A01057925
    1) Managing organization: Ministry of Education of Korea
    2) Supporting organization: National Research Foundation of Korea
    3) Research Project: Science and Engineering Fundamental Research Project/Science and Engineering Personal Fundamental Research Support Project/Basic Research
    4) Research Task: Development of Optimum Design Program for Sustainable Remodeling of Deteriorated Buildings
    5) Percent contribution: 30%
    6) Executing organization: Industry-University Cooperation Foundation Hanyang University ERICA Campus
    7) Project Period: Nov. 1, 2015-Oct. 31, 2018

TECHNICAL FIELD

The present invention relates to a device and method for building life cycle sustainability assessment using probabilistic analysis method, and a recording medium storing the method. More particularly, the present invention relates to a device and method for building life cycle sustainability assessment using probabilistic analysis method, the device and method being capable of assessing and predicting building life cycle sustainability at an initial stage of construction project by using a probability, and a recording medium storing the method.

BACKGROUND ART

Buildings affect the earth in several ways. Building construction causes side effects such as depletion of natural resources, destruction of ecosystems, contamination of air and water, generation of garbage, etc. In addition, many design factors of buildings affect the environment. However, although design is performed in consideration of the environment, it is difficult for a designer to understand various types of information on a general environment correctly and to proceed with the design accordingly.

Selection of building materials on the basis of an environmental impact is available by performing analysis using life cycle assessment (LCA). Herein, a life cycle means all stages including a material collection stage, a material supply stage, a material transport stage, a construction stage, a running stage, a demolition stage, etc., and life cycle assessment means performing quantifying all substances described above (input substances, energy, discharged substances) and performing assessment for the entire impact on the environment.

However, in a conventional life cycle assessment method for a building, although analysis of uncertainty for environmental impact, cost, and social impact assessment result of a building is important, a deterministic analysis method is used, and thus reflecting uncertain conditions of a building project in an assessment result is difficult and calculating an expectation value for an analysis result is not available. In addition, a conventional building life cycle assessment method is limited in that there is mathematical limit that an average trap can occur when reflecting variables of asymmetrical structure.

[Prior art document] Korean Patent No. 1390237

DISCLOSURE

Technical Problem

Accordingly, the present invention has been made keeping in mind the above problems occurring in the prior art, and an object of the present invention is to provide a device and method for building life cycle sustainability assessment using a probabilistic analysis method, the device and method being capable of objectively assessing building sustainability and quantifying uncertainty so as to minimize the risk due to decision making at an initial stage of a building project, and a recording medium storing the method.

In addition, another object of the present invention is to provide a device and method for building life cycle sustainability assessment using a probabilistic analysis method, the device and method being capable of assessing useful life cycle sustainability at an initial stage of a building project by checking a mode (value) having the highest occurrence in term of probability by reflecting features of a building when assessing life cycle sustainability, and a recording medium storing the method.

Meanwhile, still another object of the present invention is to provide a device and method for building life cycle sustainability assessment using a probabilistic analysis method, the device and method being capable of effectively providing to a decision maker useful information by simultaneously providing an expectation value that has not been calculated in a conventional deterministic method assessment model, an average value, a minimum value, and a maximum value which are corrected in a probabilistic manner when assessing life cycle sustainability, and a recording medium storing the method.

In addition, still another object of the present invention is to provide a device and method using a probabilistic analysis method, the device and method being capable of providing an average value that is probabilistically corrected by using an assessment result obtained by repeatedly performing Monte Carlo simulation, and thus providing an assessment result that is more significant than an assessment result in terms of average value which is generally used in a conventional deterministic method assessment model, and a recording medium storing the method.

Technical Solution

In order to accomplish the above object, an embodiment of the present invention includes: a first storage unit storing a reference environmental impact assessment value of a reference building, a first environmental impact coefficient group obtained by digitizing an environmental impact degree per input unit of a plurality of building materials, and a second environmental impact coefficient group obtained by digitizing an environmental impact degree per consumption unit of a plurality of energy sources; an input unit for receiving area information of a building, an amount of input of the plurality of building materials, and an amount of consumption of the plurality of energy sources; a probability distribution calculating unit storing a set value of a form of a probability distribution of the building material and the energy source according to the area information of the building, and for the amount of input of the plurality of building materials and the amount of consumption of the plurality of energy sources, deducing a probability distribution of the amount of input of the plurality of building materials and a probability distribution of the amount of consumption of the plurality of energy sources according to the set value; a first arithmetic unit calculating, through Monte Carlo simulation, a probability distribution of a first environmental impact assessment value by the building material by using the probability distribution of the amount of input of the plurality of building materials and the first environmental impact coefficient group, calculating a probability distribution of a second environmental impact assessment value by the energy source by using the probability distribution of the amount of consumption of the plurality of energy sources and the second environmental impact coefficient group, and calculating a probability distribution of a life cycle environmental impact assessment value by adding the probability distribution of the first environmental impact assessment value and the probability distribution of the second environmental impact assessment value; and a first output unit deducing a probability distribution of an environmental impact index by dividing the reference environmental impact assessment value stored in the first storage unit by the probability distribution of the life cycle environmental impact assessment value which is calculated in the first arithmetic unit, and outputting the deduced probability distribution of the environmental impact index.

In addition, the embodiment of the present invention may further include: a second storage unit storing a reference cost assessment value of the reference building, a first cost coefficient group obtained by digitizing a required cost degree per input unit of the plurality of building materials, and a second cost coefficient group obtained by digitizing a required cost degree per consumption unit of the plurality of energy sources; a second arithmetic unit calculating, through Monte Carlo simulation, a probability distribution of a first cost assessment value by the building material by using the probability distribution of the amount of input of the plurality of building materials and the first cost coefficient group, calculating a probability distribution of a second cost assessment value by the energy source by using the probability distribution of the amount of consumption of the plurality of energy sources and the second cost coefficient group, and calculating a probability distribution of a life cycle cost assessment value by adding the probability distribution of the first cost assessment value and the probability distribution of the second cost assessment value; and a second output unit deducing a probability distribution of a cost index by dividing the reference cost assessment value stored in the second storage unit by the probability distribution of the life cycle cost assessment value calculated in the second arithmetic unit, and outputting the deduced probability distribution of the cost index.

In addition, the embodiment of the present invention may further include: assessment value of the reference building, and a social impact coefficient group obtained by digitizing a social impact degree per input unit of the plurality of building materials; a third arithmetic unit calculating, through Monte Carlo simulation, a probability distribution of a life cycle social impact assessment value by using the probability distribution of the amount of input of the plurality of building materials and the social impact coefficient group; and a third output unit deducing a probability distribution of a social impact index by dividing the probability distribution of the life cycle social impact assessment value calculated in the third arithmetic unit by the reference social impact assessment value stored in the third storage unit, and outputting the deduced probability distribution of the social impact index.

In addition, the embodiment of the present invention may further include: a probability distribution outputting unit deducing a probability distribution of a sustainable building index through Monte Carlo simulation and $$P\text{-}SBI = \alpha P\text{-}EI + \beta P\text{-}CI + \gamma P\text{-}SI,$$

wherein P-SBI is a probability distribution of the sustainable building index, P-EI is the probability distribution of the environmental impact index, P-CI is the probability distribution of the cost index, P-SI is the probability distribution of the social impact index, and $\alpha$, $\beta$, and $\gamma$ are weighting factors which are set as $1=\alpha+\beta+\gamma$, and outputting the deduced probability distribution of the sustainable building index.

Meanwhile, in order to accomplish the above object, another embodiment of the present invention include: step (a) storing a reference environmental impact assessment value of a reference building, a first environmental impact coefficient group obtained by digitizing an environmental impact degree per input unit of a plurality of building materials, and a second environmental impact coefficient group obtained by digitizing an environmental impact degree per consumption unit of a plurality of energy sources; step (b) receiving area information of a building, an amount of input of the plurality of building materials, and an amount of consumption of the plurality of energy sources; step (c) for the amount of input of the plurality of building materials and the amount of consumption of the plurality of energy sources, deducing a probability distribution of the amount of input of the plurality of building materials and a probability distribution of the amount of consumption of the plurality of energy sources according to a set value stored in advance on a form of a probability distribution of the building material and the energy source according to the area information of the building; step (d) calculating, through Monte Carlo simulation, a probability distribution of a first environmental impact assessment value by the building material by using the probability distribution of the amount of input of the plurality of building materials and the first environmental impact coefficient group, calculating a probability distribution of a second environmental impact assessment value by the energy source by using the probability distribution of the amount of consumption of the plurality of energy sources and the second environmental impact coefficient group, and calculating a probability distribution of a life cycle environmental impact assessment value by adding the probability distribution of the first environmental impact assessment value and the probability distribution of the second environmental impact assessment value; and step (e) deducing a probability distribution of an environmental impact index by dividing the reference environmental impact assessment value by the probability distribution of the life cycle environmental impact assessment value which is calculated in the step (d), and outputting the deduced probability distribution of the environmental impact index.

In addition, in order to accomplish the above object, another embodiment of the present invention may further include: step (f) storing a reference cost assessment value of the reference building, a first cost coefficient group obtained by digitizing a required cost degree per input unit of the plurality of building materials, and a second cost coefficient group obtained by digitizing a required cost degree per consumption unit of the plurality of energy sources; step (g) calculating, through Monte Carlo simulation, a probability distribution of a first cost assessment value by the building material by using the probability distribution of the amount of input of the plurality of building materials and the first cost coefficient group, calculating a probability distribution of a second cost assessment value by the energy source by using the probability distribution of the amount of consumption of the plurality of energy sources and the second cost coefficient group, and calculating a probability distribution of a life cycle cost assessment value by adding the probability distribution of the first cost assessment value and the probability distribution of the second cost assessment value; and step (h) deducing a probability distribution of a cost index by dividing the reference cost assessment value by the probability distribution of the life cycle cost assessment value calculated in the step (g), and outputting the deduced probability distribution of the cost index.

Meanwhile, in order to accomplish the above object, another embodiment of the present invention may further include: step (i) storing a reference social impact assessment value of the reference building, and a social impact coefficient group obtained by digitizing a social impact degree per input unit of the plurality of building materials; step (j) calculating, through Monte Carlo simulation, a probability distribution of a life cycle social impact assessment value by using the probability distribution of the amount of input of the plurality of building materials and the social impact coefficient group; and step (k) deducing a probability distribution of a social impact index by dividing the probability distribution of the life cycle social impact assessment value calculated in the step (j) by the reference social impact assessment value, and outputting the deduced probability distribution of the social impact index.

In addition, in order to accomplish the above object, another embodiment of the present invention may further include: step (1) deducing a probability distribution of a sustainable building index through Monte Carlo simulation and $$P\text{-}SBI = \alpha P\text{-}EI + \beta P\text{-}CI + \gamma P\text{-}SI,$$

wherein P-SBI is a probability distribution of the sustainable building index, P-EI is the probability distribution of the environmental impact index, P-CI is the probability distribution of the cost index, P-SI is the probability distribution of the social impact index, and $\alpha$, $\beta$, and $\gamma$ are weighting factors which are set as $1 = \alpha + \beta + \gamma$, and outputting the deduced probability distribution of the sustainable building index In addition, in order to accomplish the above object, still another embodiment of the present invention may provide a computer readable recording medium storing a program executing a building life cycle sustainability assessment method using a probabilistic analysis method.

Advantageous Effects

According to the present invention described above, assessment of building sustainability can be objectively performed, and uncertainty can be quantified, and thus risk according to decision making at an initial stage of a building project can be minimized.

In addition, in the present invention, a useful assessment result can be provided at an initial stage of a building project by checking a mode (value) having the highest occurrence in term of probability by reflecting features of a building when assessing life cycle sustainability.

Meanwhile, in the present invention, more useful information can be provided for decision making by simultaneously providing an estimated value that has not been calculated in a conventional deterministic method assessment model, an average value, a minimum value, and a maximum value which are corrected in a probabilistic manner when assessing life cycle sustainability.

In addition, in the present invention, an average value that is probabilistically corrected can be provided by using an assessment result obtained by repeatedly performing Monte Carlo simulation, and thus an assessment result that is more significant than an assessment result in terms of average value which is generally used in a conventional deterministic method assessment model can be provided.

DESCRIPTION OF DRAWINGS

FIG. 10 to FIG. 15 show an analyzed probability distribution form of a major building material set in the probability distribution calculation unit.

FIG. 16 shows where environmental impact coefficients (EIC1) for building materials are calculated by using the national LCI DB (A) or the national DB for environmental information of building products (B) as a data source.

FIG. 17 shows damage factors (DFk,i,j) by reference substances of the environmental impact categories.

FIGS. 18 to 21 represent results of analyzing a social topic of a worker category for a ready-mixed concrete.

DESCRIPTION OF THE REFERENCE NUMERALS IN THE DRAWINGS

Figure 1:
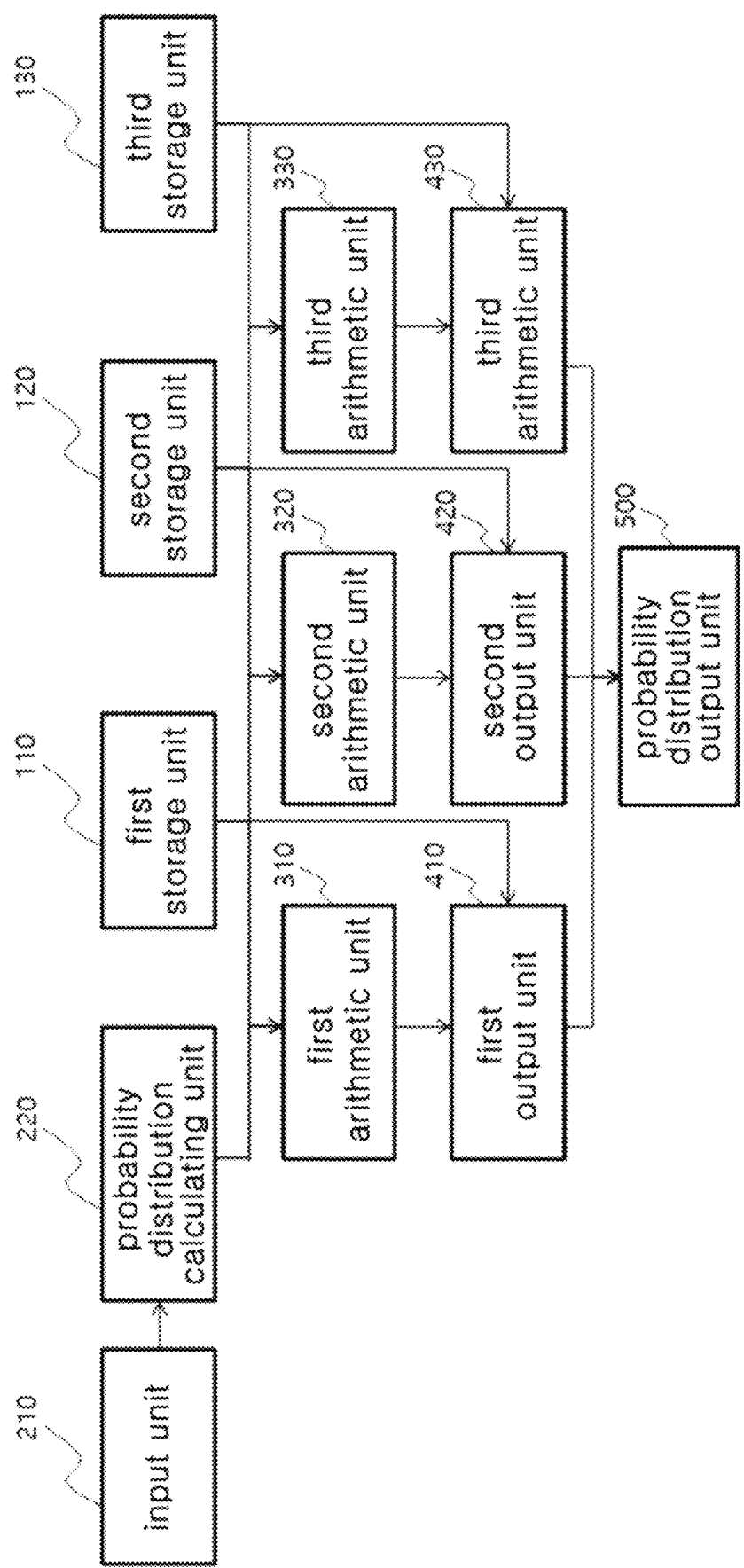
FIG. 1 is a view of a block diagram showing a building life cycle sustainability assessment device using a probabilistic analysis method according to an embodiment of the present invention.

110: first storage unit
120: second storage unit
130: third storage unit
210: input unit
220: probability distribution calculating unit
310: first arithmetic unit
320: second arithmetic unit
330: third arithmetic unit
410: first output unit
420: second output unit
430: third output unit
500: probability distribution output unit

MODE FOR INVENTION

Hereinbelow, preferred embodiments of the present invention will be described in detail with reference to the accompanying drawings. However, it should be understood that the embodiment of the present invention may be changed to a variety of embodiments and the scope and spirit of the present invention are not limited to the embodiment described hereinbelow. Also, for convenience of understanding of the elements, in the figures, sizes or shapes of elements may be exaggerated to be large (or thick), may be expressed to be small (or thin) or may be simplified for clarity of illustration, and throughout the drawings, the same reference numerals will refer to the same or like parts.

Meanwhile, the meaning of the terms described in the present application should be understood as follows It will be understood that, although the terms first, second, etc. may be used herein to distinguish one element, from another element. For instance, a first element discussed below could be termed a second element without departing from the teachings of the present invention. Similarly, the second element could also be termed the first element.

Throughout the specification, it will be understood that when an element is referred to as being "coupled" or "connected" to another element, it can be directly coupled or connected to the other element, or electrically coupled or connected with other elements therebetween. It will be further understood that the terms "comprise", "include", "have", etc. when used in this specification, do not preclude the presence or addition of one or more other features, integers, steps, operations, elements, components, and/or combinations thereof, unless otherwise noted.

Figure 4:
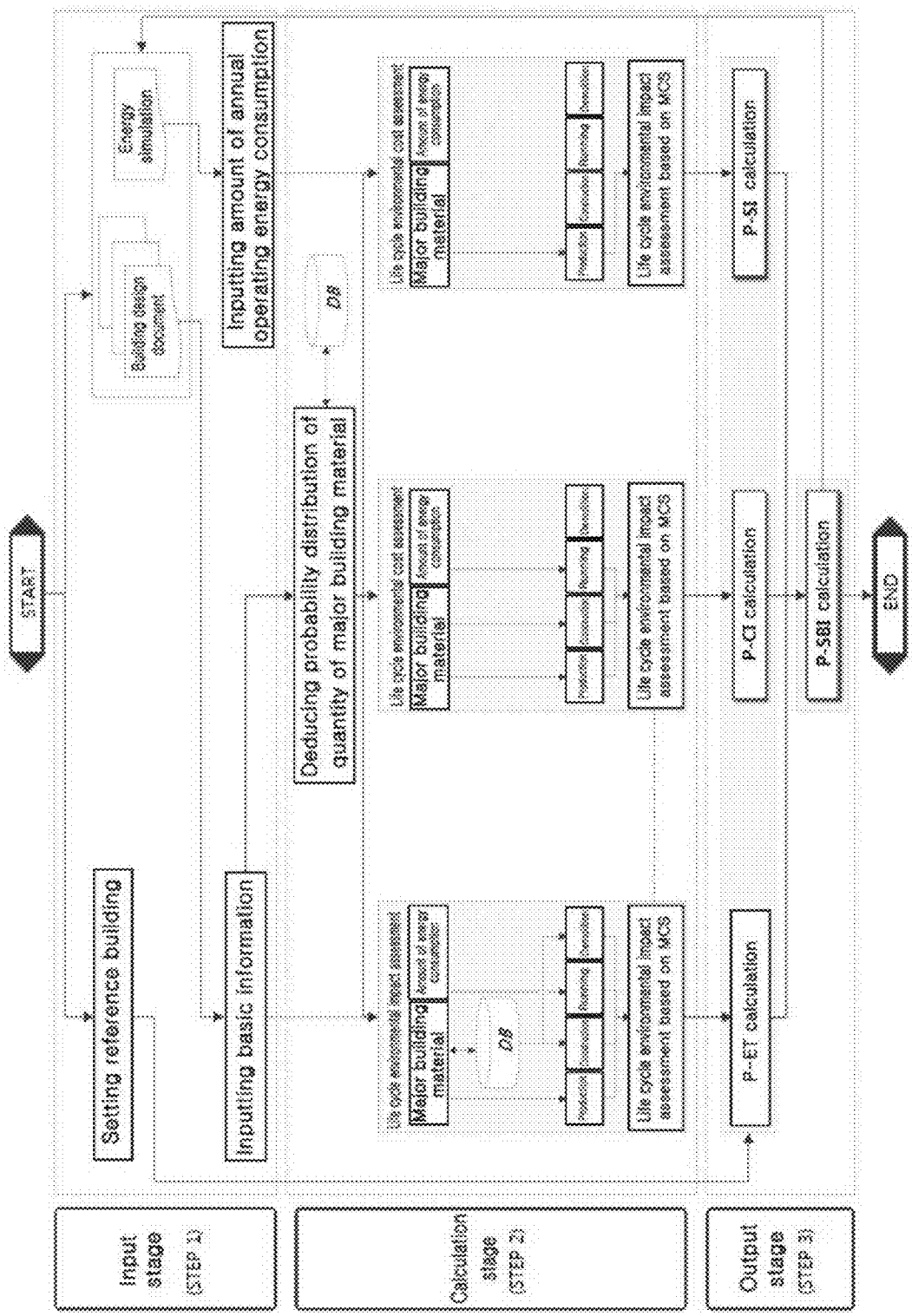
FIG. 4 is a view showing operation of a building life cycle sustainability assessment device using a probabilistic analysis method according to an embodiment of the present invention.

FIG. 1 is a view of a block diagram showing a building life cycle sustainability assessment device using a probabilistic analysis method according to an embodiment of the present invention, and FIG. 4 is a view showing operation of a building life cycle sustainability assessment device using a probabilistic analysis method according to an embodiment of the present invention. A building life cycle sustainability assessment device using a probabilistic analysis method of the present invention may include a first storage unit 110, a second storage unit 120, a third storage unit 130, an input unit 210, a probability distribution calculation unit 220, a first arithmetic unit 310, a second arithmetic unit 320, a third arithmetic unit 330, a first output unit 410, a second output unit 420, a third output unit 430, and a probability distribution output unit 500.

The first storage unit 110 may store a reference environmental impact assessment value of a reference building, a first environmental impact coefficient group obtained by digitizing an environmental impact degree per input unit of a plurality of building materials, a second environmental impact coefficient group obtained by digitizing an environmental impact degree per consumption unit of a plurality of energy sources, output the stored first environmental impact coefficient group and the second environmental impact coefficient group to the first arithmetic unit 310, and output the stored reference environmental impact assessment value to the first output unit 410.

Herein, it is preferable to digitize the first environmental impact coefficient and the second environmental impact coefficient on the basis of environmental impact categories. The environmental impact categories are concepts where potential global environmental changes caused by environmental impact substances are subdivided by using a scientific approach. The environmental impact categories includes global warming potential (GWP), acidification potential (AP), eutrophication potential (EP), ozone layer depletion potential (ODP), photochemical oxidation potential (POCP), abiotic depletion potential (ADP), etc., and causes environmental impacts on a global scale, a regional scale, and a local scale across various environmental safety categories and safety guards.

Herein, GWP is an abnormal weather phenomenon in which the average temperature of the surface of the earth rises by absorbing infrared rays emitted from the earth by greenhouse gases generated by combustion of fossil fuel. Accordingly, causing environmental problems such as changes in soil and water ecosystems and sea level rise. 42 types of environmental impact substances of GWP are present, such as carbon dioxide ($CO_2$) methane ($CH_4$), nitrogen dioxide ($N_2O$), etc. and the reference substance is $CO_2$.

AP is a regional scale environmental problem where the hydrogen ion concentration in the ocean and soil is increased (pH decrease) due to acid rain generated by the circulation of air pollutants. The leaching of heavy metals threatens the survival of creatures such as fish, plants, and animals. 36 types of environmental impact substances of AP are present, such as sulfur dioxide ($SO_2$), nitrogen oxides ($NO_x$), hydrogen sulfide ($H_2S$), hydrogen fluoride (HF), etc. and the reference substance is $SO_2$.

EP is a local scale environmental problem in which the amount of nutritional substances abnormally increases due to influx of chemical fertilizer and sewage, etc., which adversely affects the marine environment. 39 types of environmental impact substances of EP are present, such as phosphate ($PO_4^{3-}$), ammonia ($NH_3$), and nitrogen oxide (NOx), etc. and the reference substance is $PO_4^{3-}$.

ODP is a phenomenon in which the ozone of the ozone layer in the stratosphere at a height of 15 to 30 km from the ground is destroyed and its density is lowered, which induces skin diseases (skin cancer, conjunctivitis, etc.) due to the increase of ultraviolet rays. 23 types of environmental impact substances of ODP are present, such as chloro fluoro carbons 11 (CFC-11), brominated trifluoromethane (Halon-1301), chloro fluoro carbons 114, etc. and the reference substance is CFC-11.

POCP induces a smog phenomenon in a reaction in which pollutants in the air react with the sunlight to generate chemical compounds such as ozone ($O_3$), and causes loss of the ecosystem affecting human health and suppressing growth of crops. 128 types of environmental impact substances of POCP are present, such as ethylene ($C_2H_4$), non-methane-based hydrocarbon (NMVOC), ethanol ($C_2H_5OH$), etc. and the reference substance is $C_2H_4$.

ADP is a category that indicates the environmental impact of resources input from the natural world to the technical world in order to produce the product, and performs assessment for assessing ecosystem equilibrium destruction and environmental pollution due to excessive collection and consumption of resources. ADP considers 89 types of natural resources including crude oil, natural gas and uranium (U), and the reference substance is antimony (Sb).

The second storage unit 120 may store a reference cost assessment value of a reference building, a first cost coefficient group obtained by digitizing a required cost degree per input unit of a plurality of building materials, and a second cost coefficient group obtained by digitizing a required cost degree per consumption unit of a plurality of energy sources, output the stored first cost coefficient group and the second cost coefficient group to the second arithmetic unit 320, and output the stored reference environmental impact assessment value to the second output unit 420.

Herein, the first cost coefficient and the second cost coefficient reflect all costs directly input during a life cycle including a production stage and a running stage of a production system, and also reflects a private cost that means a conventional life cycle cost and an external cost of environmental impact as a method of additionally considering at least one external cost.

The third storage unit 130 may store a reference social impact assessment value of a reference building, a social impact coefficient group obtained by digitizing a social impact degree per input unit of a plurality of building materials, output the stored social impact coefficient group to the third arithmetic unit 330, and output the stored reference environmental impact assessment value to the third output unit 430.

Herein, the social impact coefficient is a value obtained by digitizing a social impact degree related to a social topic. According to "Guidelines for Social Life Cycle Assessment of Products", social topics of S-LCA are divided into five stakeholder categories and a number of social topics constituting the same. The social impact coefficient is a reference for determining a degree of a social impact of a specific company, organization or business producing and providing a production system on their stakeholders (workers, consumers, local community, society, value chain), and definition of representative social topics and contents thereof are described below.

For the social topics on a worker, the freedom of association and collective bargaining means assigning the freedom and right to join a labor union and to create the labor union to promote the interests of individual workers and organizations. Herein, the worker should be free to join a labor union, and there should be no external intervention or discrimination. In addition, the labor union should have the freedom and right to perform activities such as worker strikes, election of labor union heads, trade union activities and program formulation.

Child labor refers to the elimination of the potential and dignity of a child by engaging a child in work by a corporation or organization and hindering physical and mental growth. The form of child labor consists of slaving children, exposing them to serious risks and illnesses, and separating children from their families.

Fair salary means that a business or organization pays a worker more than the minimum wage prescribed by at least one of the minimum wage law, association and industry standard wage for the normal working hours of the worker. Herein, the level of wages must be of sufficient level in order for workers and their families to maintain a moderate living standard based on workers who have worked standard working hours.

Working hours means assigning, for a company or organization, proper working hours to a worker in consideration of legal working hours, holidays, and industry standard working hours. In Korea, legal working hours are 40 hours per week (excluding overtime hours) and at least one day of holiday must be provided every seven days. In addition, overtime work must be done in a voluntary workplace environment and atmosphere, must not exceed 12 hours a week, and legal or overtime stipulated excess work allowance must be paid.

Forced labor means labor imposed by the threat and penalty of someone, and not the voluntary participation of the worker in the business or organization. Forced labor includes debt bondage, indentured servitude, human trafficking, etc. Workers must be able to freely travel to and from workshops without being restricted by administrator interference and intimidation, and freedom of time other than work must be guaranteed.

Equal opportunities and discrimination means equally paying, by a company or organization, for an equal business value regardless of religion, sex, race, age, etc. by acknowledging the human diversity of workers.

Health and safety means to improve, by a company or organization, the level of physical, mental, and social well-being of all workers and to maintain the same. Herein, the work environment should not be deleterious to workers health, and protect the workers from risk factors. In addition, the work environment should be located where it does not adversely affect the physiological and psychological functions of the worker, and work arrangements should be made in consideration of the gender and job fitness of the worker Social benefits means to comply, by a company or organization, in addition to payment of wages to the worker, all regulations related to social welfare. The social benefits are provided on the basis of work records (salary or income) of the worker, and include a severance pay, a disability allowance, a dependency allowance, family bereavement benefits, etc.

For the social topics on a consumer, health and safety means that a product produced by a company or organization sufficiently perform an intended function thereof when the same is used by a consumer without damaging health and safety of the consumer. In addition, the product should be in consideration of both the risks and the positive effects that can be given to the health and safety of the final consumer (end-user).

For the social topics on a local community, access to material resources means that a corporation or organization respects and protects the material resources (such as water, land, mineral and biological resources) and infrastructure (roads, sanitation facilities, schools, etc.) owned by local communities. This includes the rights of land owned by indigenous people and includes a system of mutual sharing with local communities for the use of material resources and the protection and strengthening of infrastructure. In addition, the use of material resources should ultimately be a positive factor in the long-term economic development of the local community.

Safe and healthy living conditions means to strive, by a company or organization, for the safety and health of the local community member, and public health. In other words, indiscriminate uses and development of business sites of companies or organizations located in the local community can cause natural disasters such as landslides, and emissions of unclean wastewater and rapid influx of workers can promote the spreading of infectious diseases in local communities.

Local community engagement means whether or not members of a local community are included as stakeholders during decision making of a company or organization. Particularly, in the process of realizing the community's environment and its members' health and welfare-related decisions and business policies, it is necessary to include communities (individuals or the entire community) as stakeholders.

Local employment means a role, directly run by a company or organization, related to employment of member of a local community such as job creation, income generation, job education, etc. By the same, open communication and relation with members of the community can be promoted, and contribution to the development of the community can be achieved.

The input unit 210 receives area information of a building, an amount of input of a plurality of building materials, and an amount of consumption of a plurality of energy sources, and outputs the amount of input of the plurality of building materials or the amount of consumption of the plurality of energy sources to the probability distribution calculation unit 220. In other words, the input unit 210 may receive amounts of input of ten types of major building materials (ready-mixed concrete, rebar, glass, concrete brick, insulation, gypsum board, fittings, stone, tile, paint) based on a bill of quantities, and receive amounts of annual operating energy consumption by energy sources which are assessed by an energy simulation tool, etc. As an energy simulation tool, both DOE-2 developed in Lawrence Berkeley laboratory (LBL) under the auspices of the US Department of Energy, and BLAST developed by the US Army, which are tools capable of calculating an amount of annual energy consumption, may be used, but it is not limited thereto.

The input unit 210 may receive a reference environmental impact assessment value, a reference cost assessment value of a reference substance, and a level of a reference social impact assessment value, and store the same in the first storage unit 110, the second storage unit 120, and the third storage unit 130, and receive area information of a building which includes a gross area, a floor area, an area of exclusive use space, etc. based on a building design document.

The probability distribution calculation unit 220 stores a set value in a form of probability distribution of building materials and energy sources according to area information of a building, for the amount of input of the plurality of building materials and the amount of consumption of the plurality of energy sources which are provided from the input unit 210, deduces probability distributions of the amount of input of the plurality of building materials and the amount of consumption of the plurality of energy sources according to the pre-stored set value, and outputs the deduced probability distribution of the amount of input of the plurality of building materials, and the deduced probability distribution of the amount of consumption of the plurality of energy sources to the first arithmetic unit 310, the second arithmetic unit 320, or the third arithmetic unit 330.

An operation of deducing the set value in form of probability distribution and the probability distribution of the building materials and the energy sources which are stored in the probability distribution calculation unit 220 will be described in below.

First, 38 apartment housing complexes which are domestically designed and built in within the last ten years are set as samples (refer to Table 12 below), main parameters are deduced by analyzing correlation of building features and major building materials. In addition, using the main variables and quantity information of the major building materials, probability distributions of the major building materials may be analyzed through Fit distribution and goodness of fit test.

In order to analyze a probability distribution of the major building material according to a building feature, analyzing correlation therebetween and setting a proper variables have to be performed, and analyzing correlation therebetween is performed by collecting basic information and quantity information of the major building materials of the above 38 apartment housing complexes which are set as samples, and by using a Pearson correlation coefficient.

Herein, the 38 apartment housing complexes is divided into 443 residential buildings, 88 annexed buildings, and 38 underground parking lots according to a function of the building. Variables for analyzing correlations are deduced based on design variables determined in an initial stage of a building project. In other words, residential buildings are set to have eight variables including a structure type, a flat form, a unit combination, a number of ground floors, a building area, an area of exclusive use space, a floor area, and a number of households, annexed buildings are set to have two variables including a number of ground floors and a floor area, and underground parking lots are set to have three variables including a number of underground floors, a gross underground area, and a number of households.

By using a bivariate correlation coefficient analysis function of a statistical program, a Pierson correlation coefficient between quantities of the major building materials and the above variables is deduced. Herein, the Pierson correlation coefficient is used as a gauge for determining a relation between two variables, a value between two variables has as value of $-1 \leq R \leq 1$, and the correlation of the correlation coefficient is determined according to the above value. In other words, when the Pierson correlation coefficient is 0. to 0.1, it means that correlation is not present, when the Pierson correlation coefficient is 0.1 to 0.2, it means that weak positive correlation is present, when the Pierson correlation coefficient is 0.2 to 0.4, it means that general positive correlation is present, when the Pierson correlation coefficient is 0.4 to 0.6, it means that relatively strong positive correlation is present, when the Pierson correlation coefficient is 0.6 to 0.8, it means that strong positive correlation is present, and when the Pierson correlation coefficient is 0.8 to 1.0, it means that very strong positive correlation is present.

When analyzing a correlation coefficient, the residential building may be analyzed by including all of the ten major building materials, but the annexed building and the underground parking lot may be analyzed by including ready-mixed concrete and rebar which are materials having the highest influence among the major building materials. Tables 1 to 3 below respectively represent a correlation coefficient table of a residential building, a annexed building, and an underground parking lot.

residential building. In addition, ready-mixed concrete and rebar are highly correlated with a structure type and a flat form of the residential building, and concrete brick and gypsum board vary in quantity according to a flat form of the residential building.

Meanwhile, it is analyzed that both of ready-mixed concrete and rebar input to the annexed building are highly correlated with a floor area (refer to Table 2), and quantities of ready-mixed concrete and rebar for the underground parking lot are highly correlated with a underground gross area (refer to Table 3).

By using the above correlation coefficient between the apartment housing complex feature and the major building material, a matrix configured with a probability distribution for 30 types of the major building materials is established as Table 4, and the most appropriate probability distribution for each major building material may be determined by using a

TABLE 1

| Classification | Structure form | Flat form | Unit combination | Number of ground floors | Building area | Area of exclusive use space | Floor area | Number of households |
|---|---|---|---|---|---|---|---|---|
| Structure form | 1.000 | | | | | | | |
| Flat form | 0.436 | 1.000 | | | | | | |
| Unit combination | 0.336 | 0.569 | 1.000 | | | | | |
| Number of ground floors | 0.411 | 0.387 | 0.209 | 1.000 | | | | |
| Building area | 0.302 | 0.314 | 0.266 | 0.669 | 1.000 | | | |
| Area of exclusive use space | 0.288 | 0.309 | 0.294 | 0.703 | 0.698 | 1.000 | | |
| Floor area | 0.269 | 0.293 | 0.342 | 0.706 | 0.745 | 0.977 | 1.000 | |
| Number of households | 0.328 | 0.402 | 0.673 | 0.673 | 0.632 | 0.765 | 0.806 | 1.000 |
| Ready mixed concrete | 0.866 | 0.876 | 0.348 | 0.647 | 0.635 | 0.977 | 0.954 | 0.768 |
| Rebar | 0.841 | 0.902 | 0.387 | 0.615 | 0.684 | 0.913 | 0.910 | 0.758 |
| Concrete brick | 0.741 | 0.861 | 0.258 | 0.652 | 0.598 | 0.907 | 0.890 | 0.696 |
| Gypsum board | 0.744 | 0.836 | 0.263 | 0.695 | 0.614 | 0.972 | 0.947 | 0.740 |
| Window frame | 0.762 | 0.789 | 0.279 | 0.676 | 0.633 | 0.958 | 0.932 | 0.739 |
| Stone | 0.742 | 0.763 | 0.254 | 0.687 | 0.721 | 0.957 | 0.931 | 0.716 |
| Tile | 0.706 | 0.774 | 0.301 | 0.692 | 0.699 | 0.995 | 0.972 | 0.766 |
| Glass | 0.725 | 0.723 | 0.304 | 0.665 | 0.719 | 0.963 | 0.938 | 0.744 |
| Insulation | 0.746 | 0.744 | 0.283 | 0.614 | 0.714 | 0.897 | 0.881 | 0.683 |
| Paint | 0.766 | 0.734 | 0.304 | 0.697 | 0.722 | 0.998 | 0.976 | 0.770 |

TABLE 2

| Classification | Number of ground floors | Floor area | Ready mixed concrete | Rebar |
|---|---|---|---|---|
| Number of ground floors | 1.000 | | | |
| Floor area | 0.657 | 1.000 | | |
| Ready mixed concrete | 0.438 | 0.966 | 1.000 | |
| Rebar | 0.526 | 0.948 | 0.926 | 1.000 |

TABLE 3

| Classification | Number of ground floors | Gross Underground area | Number of households | Ready mixed concrete | Rebar |
|---|---|---|---|---|---|
| Number of ground floors | 1.000 | | | | |
| Gross underground area | 0.501 | 1.000 | | | |
| Number of households | 0.387 | 0.865 | 1.000 | | |
| Ready mixed concrete | 0.422 | 0.945 | 0.653 | 1.000 | |
| Rebar | 0.356 | 0.938 | 0.703 | 0.922 | 1.000 |

According to Table 1, it is analyzed that quantities of major building materials input to a residential building have highest correlation with an area of exclusive use space of the Fit distribution. Herein, as a goodness of fit test method for a probability distribution, a Chi-square test ($\chi^2$ test), a Kolmogorov-Smirnov test (K-S test), an Anderson-Darling test (A-D test) are generally used. A probability distribution may be determined on the basis of a fit statistic of the A-D test that is widely used in the field among the above test methods. Herein, the A-D test is a method of performing test whether or not practical data and a distribution form are appropriate. Generally, when an A-D statistic is deduced to be equal to or less than 1.50, it means that a distribution is relatively highly appropriate. All of A-D statistics of the probability distributions of the major building materials are analyzed to be equal to or less than 1.50, and by using the same, significance of the probability distribution may be determined.

TABLE 4

| | Residential building | | | | | | | | |
|---|---|---|---|---|---|---|---|---|---|
| | Wall structure | | | Rahmen structure | | | | | |
| classification | Plate-type | Tower-type | Mixed-type | Plate-type | Tower-type | Mixed-type | Flat plate structure | Annexed buildings | Underground parking lot |
| Ready mixed concreter | PDF-01 (0.807) | PDF-02 (0.544) | PDF-03 (0.428) | PDF-04 (0.192) | PDF-05 (1.139) | PDF-06 (0.654) | PDF-07 (0.351) | PDF-27 (0.762) | PDF-29 (0.425) |
| Rebar | PDF-08 (0.727) | PDF-09 (0.432) | PDF-10 (0.404) | PDF-11 (0.136) | PDF-12 (0.483) | PDF-13 (1.101) | PDF-14 (0.865) | PDF-28 (0.931) | PDF-30 (0.769) |
| Concrete brick | PDF-15 (0.875) | PDF-16 (0.669) | PDF-17 (0.781) | PDF-15 (0.875) | PDF-16 (0.669) | PDF-17 (0.781) | PDF-15 (0.875) | — | — |
| Gypsum board | PDF-18 (0.635) | PDF-19 (0.721) | PDF-20 (0.569) | PDF-18 (0.635) | PDF-19 (0.721) | PDF-20 (0.569) | PDF-18 (0.635) | — | — |
| Window frame | | | | PDF-21 (0.686) | | | | — | — |
| Stone | | | | PDF-22 (0.473) | | | | — | — |
| Tile | | | | PDF-23 (0.685) | | | | — | — |
| Glass | | | | PDF-24 (0.573) | | | | — | — |
| Insulation | | | | PDF-25 (0.472) | | | | — | — |
| Paint | | | | PDF-26 (0.549) | | | | — | — |

(A-D test value)

When selecting a probability distribution of the major building material, the most important factor is that an accuracy of an assessment result is determined according to a similarity degree between a probability distribution form of the selected probability distribution and a practical situation. Accordingly, as a tool for Fit distribution, a crystal ball is used, wherein a probability distribution may be determined through a calculation result of fit statistic according to goodness of fit test provided from the present tool. In addition, a quantity of the major building material may be assumed to be an independent variable that is not dependent on a quantity of another major building material. FIG. 10 to FIG. 15 show an analyzed probability distribution form of a major building material set in the probability distribution calculation unit 220. In addition, similar to a method of deducing a probability distribution form of the building material which is described above, a probability distribution form of the energy source may be deduced, but for convenience, description thereof will be omitted.

The first arithmetic unit 310, by using Monte Carlo simulation, may calculate a probability distribution of a first environmental impact assessment value by the building material by using the probability distribution of the amount of input of the plurality of building materials provided from the probability distribution calculation unit 220 and by using the first environmental impact coefficient group provided from the first storage unit 110; calculate a probability distribution of a second environmental impact assessment value by the energy source by using the probability distribution of the amount of consumption of the plurality of energy sources provided from the probability distribution calculation unit 220 and the second environmental impact coefficient group provided from the first storage unit 110; calculate a probability distribution of a life cycle environmental impact assessment value by adding the probability distribution of the first environmental impact assessment value and the probability distribution of the second environmental impact assessment value; and output the calculated probability distribution of the life cycle environmental impact assessment value to the first output unit 410.

Herein, Monte Carlo simulation (MCS) is a representative method among probabilistic analysis methods, and is performed on the basis of a probabilistic system providing effective decision making by performing simulation using a probabilistic model of variables under uncertain conditions. The key point of Monte Carlo simulation is an experiment on the probability elements of a model, which is performed using a tool that generates a probabilistic or random result. The above tool is used for generating a random result by using random sampling according to a probability distribution assumed in a model. Accordingly, random numbers between 0 and 1 are generated by performing N times of simulation, and an input value based on the random numbers is extracted from a probability distribution model. In addition, a result of which the input value is applied is deduced and stored, and a result value based on descriptive statistics is calculated.

Based on an environmental life cycle assessment (ELCA) published in ISO 14040 series, the first arithmetic unit 310 may apply as input of Monte Carlo simulation a calculation formula using Environmental impact Assessment Method (EAM) that is a method of quantitatively assessing a life cycle environmental impact of a building in an initial stage of a building project, the probability distribution of amount of input of the building materials and the probability distribution of the amount of consumption of the energy sources.

Accordingly, as described above, major environmental impact categories for assessing an environmental impact of a building are selected, and environmental impact coefficients corresponding to the first environmental impact coefficient and the second environmental impact coefficient of the building material and the energy source may be established in the first storage unit 110.

In addition, in order to establish a method for life cycle inventory (LCI) of a building, the first arithmetic unit 310 has deduced major building materials having a high occurrence rate of an environmental impact, and established a life cycle scenario including a construction stage, a running stage, a demolition stage of a building based on the above materials, and the life cycle scenario may be used when calculating an environmental impact assessment value. Herein, the first arithmetic unit 310 may use a Korean life cycle impact assessment method based on Korean damage-oriented modeling (KOLID) which is an LCIA method based on damage-oriented modeling provided from Ministry of Environment as a life cycle environmental impact assessment (LCIA) method.

In other words, the first arithmetic unit 310 may quantitatively calculate an environmental impact for all environmental impact categories, but may perform calculation for major environmental impact categories that are selected in advance for calculation efficiency. For example, major environmental impact categories may be selected in terms of a building by analyzing environmental impact categories which are applied to an international organization for standardization (ISO) and guidelines related to a life cycle environmental impact assessment of a building, and a green building certification system and a building life cycle environmental impact assessment tool. The environmental impact categories selected as above may be six which are global warming potential, acidification potential, eutrophication potential, ozone layer depletion potential, photochemical oxidation potential, and resource depletion.

The first storage unit 110 stores environmental impact coefficients corresponding to the first environmental impact coefficient and the second environmental impact coefficient, and the environmental impact coefficient means a value that is obtained in advance by quantifying an environmental impact according to environmental impact categories on the basis of LCI DB (data obtained by listing in advance an amount of resources (including resources collected from the environment, energies, minerals) input to a product system according to a functional unit of the product system, and amount of occurrences of discharge (atmosphere and water system) and waste which are released into the environment) established by products. The first storage unit 110 may store environmental impact coefficients of building materials and energy sources in association with six environmental impact categories that are deduced previously as major environmental impact categories of a building.

First, the environmental impact coefficient corresponding to the first environmental impact coefficient of the building material may be calculated by Life Cycle Impact Assessment (LCIA) (categorization, characterization) of an LCI DB established in advance. For example, as an LCI DB for building materials, a national LCI DB (Korea LCI DB) established by Ministry of Environment and Ministry of Trade, Industry and Energy or a national DB for environmental information of building products established by Ministry of Land, Infrastructure, and Transport may be used. Alternatively, an LCI DB may be selected in an order of a regional correlation, a temporal correlation, and a technical correlation according to an LCI DB selection principle suggested in ISO 14040. Formula 1 below represents a formula for calculating an environmental impact coefficient in association with the building material using a building material LCI DB.

$$EIC1_{ij} = \sum_{k}(E_{i,k} \times IF_{j,k}) \quad \text{[Formula 1]}$$

Herein, $EIC1_{i,j}$ represents an environmental impact coefficient of an environmental impact category (j) for a functional unit of a building material (i), and, $E_{i,k}$ means an amount of discharging a substance (k) per functional unit of the building material (i), and $IF_{j,k}$ means an impact factor of the substance (k) for the environmental impact category (j).

In addition, an example of a reference substance (carbon dioxide, etc.) and an impact factor (IF) for six types of environmental impact categories, that is, global warming potential (GWP), acidification potential (AP), eutrophication potential (EP), ozone layer depletion potential (ODP), photochemical oxidation potential (POCP), and abiotic depletion potential (ADP) is as in Table 5 below.

TABLE 5

| Classification | Environment | GWP $CO_{2eq}$ | AP $SO_{2eq}$ | EP $PO_4^{3-}{}_{eq}$ | ODP $CFC-11_{eq}$ | POCP Ethylene$_{eq}$ | ADP $Sb_{eq}$ |
|---|---|---|---|---|---|---|---|
| Carbon dioxide ($CO_2$) | Air | — | — | — | — | — | — |
| CFC-11 | Air | 4.00E+03 | — | — | 1.00E+00 | — | — |
| CFC-114 | Air | 9.30E+03 | — | — | 8.50E−01 | — | — |
| CFC-12 | Air | 8.50E+03 | — | — | 8.20E−01 | — | — |
| Ethane | Air | — | — | — | — | 1.23E−01 | — |
| Ethanol | Air | — | — | — | — | 3.99E−01 | — |
| Halon-1301 | Air | 5.60E+03 | — | — | 1.20E+01 | — | — |
| Hydrogen Chloride (HCl) | Air | — | 8.80E−01 | — | — | — | — |
| Hydrogen fluoride (HF) | Air | — | 1.60E+00 | — | — | — | — |
| Nitrogen dioxide ($NO_2$) | Air | — | 7.00E−01 | 1.30E−01 | — | 2.80E−02 | — |
| Sulfur dioxide ($SO_2$) | Air | — | 1.00E+00 | — | — | 4.80E−02 | — |
| Phosphate ($PO_4^{3-}$) | Water | — | — | 1.00E+00 | — | — | — |
| Crude oil | Soil | — | — | — | — | — | 2.01E−02 |
| Lead (Pb) | Soil | — | — | — | — | — | 1.35E−02 |

Data categorization is performed by classifying and collecting substances according to environmental impact categories. For example, a reference substance and a substance of global warming potential according to an IPCC guideline are Carbon dioxide ($CO_2$), CFC-11, CFC-114, CFC-12, etc as shown in Table 5, and categorization details of a ready-mixed concrete 25-240-15 using a national LCI DB become respectively 4.20E+02 kg-CO2/m³, 2.05E−09 kg-CFC-11/m³, 2.10E−09 kg-CFC-114/m³ and 4.40E−10 kg-CFC-12/m³. Table 6 below shows categorization details using an LCI DB of building materials such as ready-mixed concrete 25-240-15, electric steel deformed_bars(rebar), paint_water type, plate glass. etc.

TABLE 6

| Classification | Environment | Ready mixed concrete 25-240-15 | Electric steel deformed bars | Paint_water type | Plate glass |
|---|---|---|---|---|---|
| Carbon dioxide ($CO_2$) | Air | 4.20E+02 | 3.40E−01 | 1.07E+03 | 7.51E+02 |
| CFC-11 | Air | 2.05E−09 | 4.02E−13 | 6.04E−07 | 5.06E−07 |
| CFC-114 | Air | 2.10E−09 | 4.12E−13 | 6.18E−07 | 5.18E−07 |
| CFC-12 | Air | 4.40E−10 | 8.64E−14 | 1.30E−07 | 1.09E−07 |
| Ethane | Air | 1.91E−03 | 4.34E−07 | 5.92E−03 | 2.10E−02 |
| Ethanol | Air | 2.73E−06 | 6.19E−10 | 7.88E−06 | 1.46E−05 |
| Halon-1301 | Air | 3.82E−06 | 8.68E−10 | 2.15E−06 | 2.52E−05 |
| Hydrogen Chloride (HCl) | Air | 1.49E−04 | 2.18E−07 | 5.76E−02 | 1.37E−02 |
| Hydrogen fluoride (HF) | Air | 1.01E−05 | 6.18E−09 | 1.83E−03 | 4.19E−03 |
| Nitrogen dioxide ($NO_2$) | Air | 6.93E−04 | 1.38E−06 | 2.50E−03 | 4.04E−03 |
| Sulfur dioxide ($SO_2$) | Air | 2.67E−01 | 4.42E−04 | 3.63E+00 | 3.62E+00 |
| Phosphate ($PO_4^{3-}$) | Water | 1.76E−04 | 4.22E−08 | 5.74E−02 | 1.13E−03 |
| Crude oil | Soil | 4.61E+01 | 2.35E−02 | 2.76E+02 | 2.38E+02 |
| Lead (Pb) | Soil | 1.39E−06 | 2.89E−15 | 1.08E−03 | 6.13E−11 |

Meanwhile, as shown in Formula 1, an environmental impact coefficient of the building material may be quantitatively calculated by characterization that multiplies an amount of discharge of a substance and an impact factor by environmental impact categories and all of the results are added. For example, impact factors of $CO_2$ that is a reference substance of global warming potential and CFC-11, CFC-114, and CFC-13 which are substances of global warming potential are respectively 1.00E+00 kg-$CO_2$/kg-$CO_2$, 4.00E+03 kg-$CO_2$/kg-CFC-11, 9.30E+03 kg-$CO_2$/kg-CFC-114, and 8.50E+03 kg-$CO_2$/kg-CFC-13. When the above impact factors are multiplied with categorization details of ready-mixed concrete (25-240-15) (4.20E+02 kg-$CO_2$/m$^3$, 2.05E−09 kg-CFC-11/m$^3$, 2.10E−09 kg-CFC-114/m$^3$, 4.40E−10 kg-CFC-12/m$^3$) and all results are added, a coefficient (4.09E+02 kg-$CO_2$ eq/m$^3$) of global warming potential for ready-mixed concrete (25-240-15) may be calculated. By using the above Formula 1, an example is shown in FIG. 16 shows where environmental impact coefficients (EIC1) for building materials are calculated by using the national LCI DB (A) or the national DB for environmental information of building products (B) as a data source.

An environmental impact coefficient of the energy source may be calculated by Formula 2 below.

$$EIC2_{ij} = \sum_k (PE_{i,k} \times IF_{j,k} + CE_{i,k} \times IF_{j,k})$$ [Formula 2]

Herein, $EIC2_{i,j}$ represents an environmental impact coefficient of an environmental impact categories (j) for a functional unit (FU) of an energy source (i), $PE_{i,k}$ means an amount of discharge of substance (k) per a functional unit (FU) according to generation of the energy source (i), $IF_{j,k}$ is an impact factor of the substance (k) for the environmental impact categories (j) as described in Table 5, and $CE_{i,k}$ means an amount of discharge of the substance (k) per a functional unit (FU) according to combustion of the energy source (i).

By using the above Formula 2, an example is shown in Table 7 where environmental impact coefficients (EIC2) for energy source are calculated by using the national LCI DB (A) or the national DB for environmental information (B) as a data source.

TABLE 7

| Energy sources | FU | Stage | Source | Environmental impact categories | | | | | |
|---|---|---|---|---|---|---|---|---|---|
| | | | | GWP | AP | EP | ODP | POCP | ADP |
| Electricity | kWh | Total | A | 4.88E−01 | 8.37E−04 | 1.56E−04 | 1.37E-3.1 | 1.41E−06 | 8.58E−04 |
| Light fuel oil | ℓ | Production | A | 3.20E−01 | 1.96E−03 | 3.39E−04 | 1.30E−06 | 7.50E−03 | 2.34E−02 |
| | | Combustion | B | 2.87E+00 | 7.90E−03 | 1.40E−03 | — | 3.74E−03 | — |
| | | Total | A, B | 3.19E+00 | 1.09E−02 | 1.74E−03 | 1.30E−06 | 1.12E−02 | 2.34E−02 |
| Gasoline | ℓ | Production | A | 8.29E−02 | 1.86E−04 | 1.07E−05 | 2.61E−10 | 8.28E−06 | 2.18E−02 |
| | | Combustion | B | 2.19E+00 | 4.34E−03 | 7.63E−04 | — | 7.14E−03 | — |
| | | Total | A, B | 2.27E+00 | 4 53E−03 | 7.74E−04 | 2.61E−10 | 7.15E−03 | 2.18E−02 |
| LNG | ℓ | Production | A | 4.96E−01 | 2.77E−03 | 1.13E−04 | 4.24E−09 | 1.87E−02 | 2.16E−02 |
| | | Combustion | B | 3.11E+00 | 3.37E−03 | 6.23E−04 | — | 1.98E−04 | — |
| | | Total | A, B | 3.61E+00 | 6.14E−03 | 7.36E−04 | 4.24E−09 | 1.89E−02 | 2.16E−02 |

In order to calculate a second environmental impact coefficient of the energy source, an environmental impact related to generation of the energy source and an environmental impact due to combustion have to be considered. For example, as an LCI DB for generating the energy source, the national LCI DB is selected, and similar to the building material, an environmental impact coefficient of the energy source corresponding to the second environmental impact coefficient may be calculated through categorization and characterization of the LCI DB.

In the above Table 7, a unit of an environmental impact coefficient by environmental impact categories of global warming potential (GWP), acidification potential (AP), eutrophication potential (EP), ozone layer depletion potential (ODP), photochemical oxidation potential (POCP), and abiotic depletion potential (ADP) is a weight (kg) of a reference substance per function unit.

The first arithmetic unit 310 may calculate, by using Monte Carlo simulation, a probability distribution of a first environmental impact assessment value by using a probability distribution of the amount of input of the plurality of building materials and by using an environmental impact coefficient of the building material which is a numerical value in association with the first environmental impact coefficient group stored in the first storage unit 110. An example of a calculation formula input to Monte Carlo simulation is as Formula 3 below.

$$EIR_j = \sum_k (Q_k \times U_k \times EIC1_{j,k}) \quad \text{[Formula 3]}$$

Herein, $EIR_j$ represents an assessment result of an environmental impact category (j) of the building, $Q_k$ is a number of building materials (k), $U_k$ is a unit conversion coefficient between a number of building materials and an environmental impact coefficient, $EIC1_{j,k}$ represents an environmental impact coefficient of the environmental impact category (j) of the building material (k). Herein, the unit conversion coefficient is a factor for adjusting the number of building materials to be associated with a functional unit of the environmental impact coefficient when the number of building materials is input by being coded. For example, when 1 ton of cement is input, a unit conversion coefficient having a value of 1000 is substituted for the above Formula 3 so as to be corresponding to an environmental impact coefficient having a functional unit of kg.

For a probability distribution of a second environmental impact assessment value, the first arithmetic unit 310 may replace a number of building materials of Formula 3, that is, an amount of input, with an amount of consumption of the energy source, replace an environmental impact coefficient of the building material with an environmental impact coefficient of the energy source, and thus perform calculation by inputting to Monte Carlo simulation, but it is not limited thereto.

In addition, the first arithmetic unit 310 may assess a life cycle environmental impact by using a life cycle scenario established in advance. For the same, a value for the life cycle environmental impact assessment may be reflected in a first environmental impact coefficient group and a second environmental impact coefficient group.

In other words, according to ISO 21931-1, life cycle stages of a building is classified into a production stage, a construction stage, a running stage, and a demolition stage, and a scenario for life cycle environmental impact assessment may be set for a construction stage, a running stage, and a demolition stage excluding a production stage.

First, a construction stage may be classified into a transportation phase and a construction phase. In the transportation phase, assessment of an environmental impact during which building materials input to the building are transported to a construction site is performed. As an example of a transportation vehicle used for building materials, a ready-mixed concrete mixer-truck may be used for transportation of ready-mixed concrete, and a 20 ton truck may be used for transportation of rebar and section steel. In addition, an 8 ton truck may be used for other building materials, and all building materials may be set to be obtained from building material manufactures within 30 km.

In the construction phase, assessment for an environmental impact due to usage of equipments and operation of field office during the construction phase is performed. In order to deduce an amount of energy consumption in the construction phase, research data (29 cases of building construction, 22 cases of civil construction, 22 cases of landscape architecture construction, 36 cases of power consumption) which indirectly deduces amounts of energy consumption during an apartment housing construction phase based on budget statement by sections and unit cost, and actual measurement of power consumption and construction record of a recent completed construction site (five cases of apartment housing) may be analyzed. Particularly, for amounts of energy consumption of construction equipments, the entire usage time by construction equipments may be analyzed by applying a usage report specified in a construction record and eight hours that is daily working hours of the Labor Standards Act, and amounts of energy consumption may be calculated by applying fuel consumption by construction equipments of standard of construction estimate. Table 8 below represents amounts of energy consumption of an apartment housing construction phase used for environmental impact assessment based on a scenario of the first arithmetic unit 310.

TABLE 8

| Light fuel oil ($\ell/m^2$) | Propane gas ($kg/m^2$) | kerosene ($\ell/m^2$) | Electricity ($kWh/m^2$) |
|---|---|---|---|
| 2.023 | 0.008 | 0.270 | 10.635 |

A running stage may be classified into an energy usage phase and a maintenance phase. For environmental impact assessment of the running stage of the apartment housing, a service life of the building has to be set. For the same, in order to assess environmental impact for the building in an initial stage of a building project and compare the result of the environmental impact assessment, a scenario may be established where 40 years that is a legal service life regulated in the national Corporate Tax Act is identically applied.

In addition, in the maintenance phase, environmental impact assessment for a building material newly input for renovation of the building is performed. For the same, an environmental impact assessment method based on a repair period and a repair rate by repair building materials suggested in the Housing Act may be applied.

A demolition stage may be classified into a building deconstruction phase, a waste material transportation phase, and a waste material landfill phase. In the building deconstruction phase, environmental impact assessment due to equipment input for demolition operation of the building is performed. Herein, in the building deconstruction phase, amounts of waste materials are calculated, and a number of building materials input in the production stage and amounts of waste materials may be set to be identical. In addition, equipments for deconstruction may be set as Backhoe (1.0 m³)+Giant breaker (0.7 m³) according to a conventional study which is generally used in a deconstruction phase.

In the waste material transportation phase, environmental impact assessment during which generated waste materials are transported to a waste landfill is performed. Herein, as a transportation vehicle, a 15 ton truck may be set according to a construction standard production unit, and a transportation distance may be set to 30 km identical to the transportation phase of the construction stage.

In the waste material landfill phase, environmental impact assessment due to waste material landfill is performed. For an environmental impact of a waste material recycle phase, a cut-off method charged by a recycle business is applied. An environmental impact of waste material that is not recycled may be considered during the waste material landfill phase. Herein, equipment for landfill may be set as Dozer (D8N, 15

PL, 6 PL)+Compactor (32 ton), and according to the results of surveys on the waste disposal status by building materials according to the waste statistic yearbook, ready-mixed concrete may be set such that 70% is recycled and 30% is reclaimed. Glass may be set such that 80% is recycled and 10% is reclaimed. In addition, gypsum board may be set such that 10% is recycled and 90% is reclaimed. Meanwhile, rebar and section steel may be set such that they are completely recycled, and concrete brick and insulation may be set such that they are completely reclaimed. Table 9 below shows amounts of energy consumption of equipments for deconstruction and landfill which are stored in the first storage unit 110 for assessment of the first arithmetic unit 310.

TABLE 9

| Classification | Equipment combination | Light fuel oil (ℓ/ton) |
|---|---|---|
| Deconstruction | Backhoe (1.0 m³) + Giant Breaker (0.7 m³) | 3.642 |
| Landfill | Dozer (DSN, 15 PL, 6 PL) + Compactor (32 ton) | 0.150 |

Figure 3:
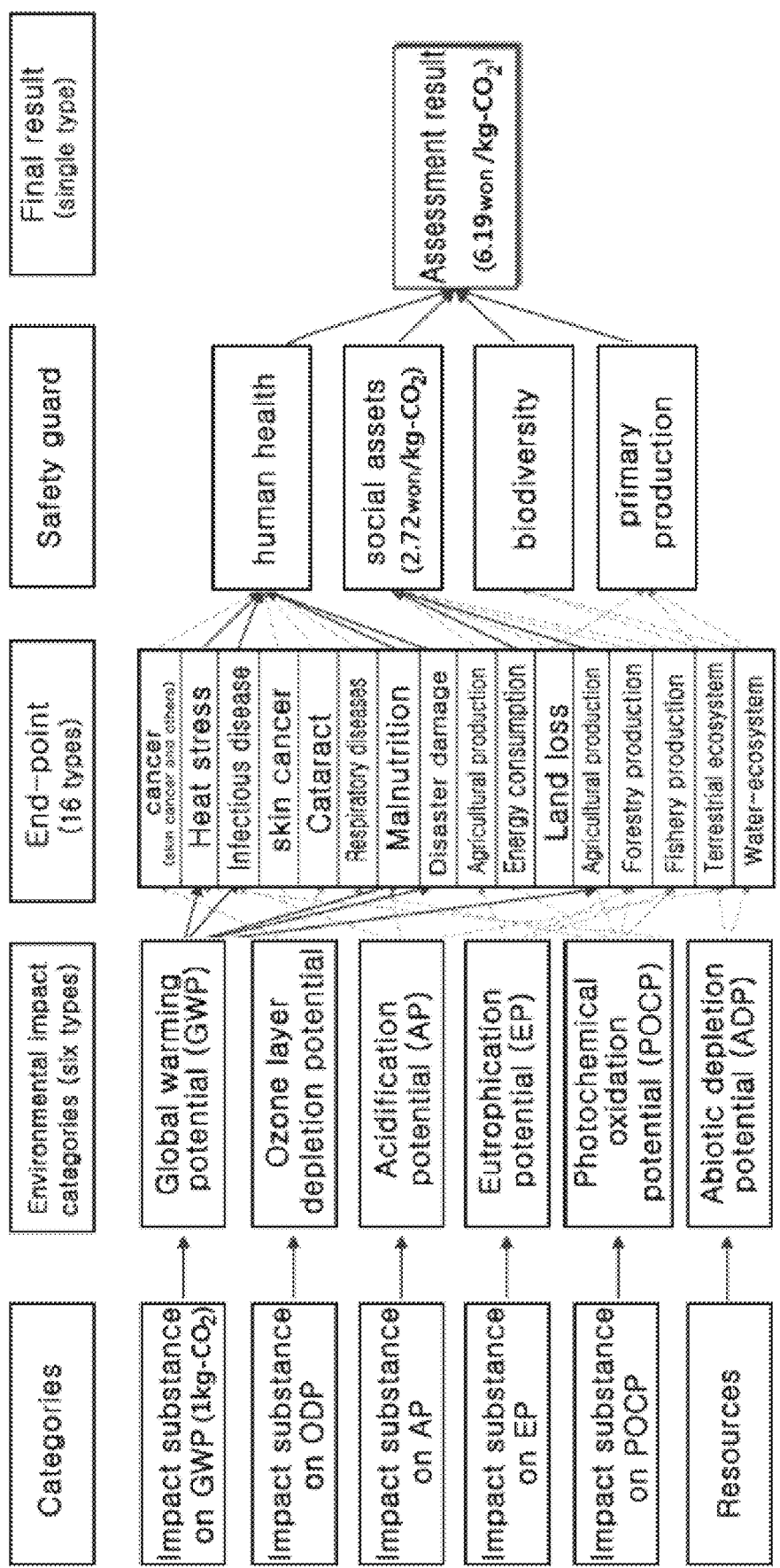
FIG. 3 is a view showing operation of an environmental impact assessment of a building life cycle sustainability assessment device using a probabilistic analysis method according to an embodiment of the present invention.

The first arithmetic unit 310 may apply a KOLID (KOrean Life cycle Impact assessment method based on a Damage oriented modeling) that is a damage oriented model developed by Ministry of Environment for life cycle environmental impact assessment based on a scenario. The KOLID quantitatively calculates: damages for 16 end points such as cancer, infectious disease, cataracts, malnutrition, land loss, agricultural production, etc. through six environmental impact categories of global warming potential, acidification potential, eutrophication potential, ozone layer depletion potential, photochemical oxidation potential, abiotic depletion potential as shown in FIG. 3; assesses the same as four safety guards of human health, social assets, biodiversity, and primary production; and deduces a single final assessment result by a monetary value. Herein, for the human health of the KOLID, DALY meaning a period (YEAR) of death or disability and illness that do not lead to death is used as a damage index, and for the social assets, economical costs (KRW) of crops, marine resources, forest resources, mineral resources, fossil fuel control and depletion are used as a damage index. In addition, for the biodiversity, assessment is performed by using EINES that is an expectation value for a number of species extinction of vascular plants and aquatic organisms as a damage index. For the primary production, NPP assessing an amount (kg/m²·yr) of organic matter due to photosynthesis of land plant and marine plankton is used as a damage index.

In addition, the first arithmetic unit 300 may reflect an environmental impact of the entire system by performing a integration according to Formula 4 below.

$$TI = \sum_k I_k = \sum_k (D_k \times IF_k) = \sum_k \sum_i \sum_j (Load_{ij} \times DF_{k,i,j} \times IF_k) \quad \text{[Formula 4]}$$

Herein, TI represents an environmental impact of the entire system according to the integration, $D_k$ represents an impact size of all items classified into a safety guard k on a corresponding safety guard, $IF_k$ represents an integration factor of the safety guard k, $Load_{i,j}$ represents an environment load of an item j classified by an impact category i, $DF_{k,i,j}$ represents a damage factor of the item j classified by the impact category i on the safety guard k, and $I_k$ represents an environmental impact of the safety guard k.

FIG. 17 shows damage factors ($DF_{k,i,j}$) by reference substances of the environmental impact categories, and Table 10 shows economic valuation costs ($IF_k$) by safety guards of the KOLID.

TABLE 10

| Safety guard | Description | Unit | Economic value (KRW/Unit) |
|---|---|---|---|
| Human health | Death, or disorders or diseases leading to death | Disability-adjusted Life Year (DALY) | 2.82E+7 |
| Social assets | Agricultural products, fishery resources, forest resources, mineral resources, fossil fuels | Currency (KRW) | 1.00E+0 |
| Biodiversity | Extinction of vascular plants and aquatic organisms | Expected extinction number of species (EINES) | 5.69E+5 |
| Primary production | Land plants and marine plankton | Net primary production (NPP) | 4.93E+4 |

When values proposed by FIG. 17 and Table 10 are applied to Formula 4, for global warming potential of the environmental impact categories, a damage factor of the human health that is a safety guard is $1.23 \times 10^{-7}$ DALY/kg-$CO_2$, an integration factor that is an economic valuation cost of the human health is 2.82E+7, and thus an environmental impact assessment result of the human health which is deduced by multiplying the damage factor and the integration factor is about 3.47KRW/kg-$CO_2$. For global warming potential of the environmental impact categories, a damage factor of the social assets that is a safety guard is 2.72KRW/kg-$CO_2$, an integration factor that is an economic valuation cost of the social assets is 1.00E+0, and thus an environmental impact assessment result of the social assets which is deduced by multiplying the damage factor and the integration factor becomes 2.72KRW/kg-$CO_2$. As a result, for global warming potential of the environmental impact categories, an environmental impact for integration becomes 6.19KRW/kg-$CO_2$ since the human health and the social assets are a safety guard (refer to FIG. 3).

On other words, the first arithmetic unit 310 may deduce an environmental impact assessment value in which a scenario is reflected by multiplying the environmental impact assessment value deduced in Formula 3 and the environmental impact value for integration deduced in Formula 4. Accordingly, it is preferable for the first environmental impact coefficient group and the second environmental impact coefficient group which are stored in the first storage unit 110 to include both an environmental impact coefficient and an environmental impact value for integration, but it is not limited thereto. For example, as the environmental impact coefficient of the global warming potential category for ready-mixed concrete stored in the first storage unit 110 is 4.09E+02KRWkg-$CO_2$/$m^3$ (refer to FIG. 16), and the result of calculating the environmental impact for integration of the global warming potential category is 6.19KRW/kg-$CO_2$, the first arithmetic unit 310 may use a first environmental impact coefficient by setting a cost per functional unit per 1 $m^3$ as 409×9.16=2532KRW. Herein, when an amount of input of the ready-mixed concrete is 10 $m^3$, the environmental impact assessment value becomes 25320KRW. By the above method, the first arithmetic unit 110, may perform calculation for all environmental categories and for all safety guards by using Monte Carlo simulation, and deduce a probability distribution of an environmental impact assessment value in which a scenario is reflected.

The second arithmetic unit 320 may calculate, by using Monte Carlo simulation, a probability distribution of a first cost assessment value by the building material by using the probability distribution of the amount of input of the plurality of building materials provided from the probability distribution calculation unit 220 and by using the first cost coefficient group provided from the second storage unit 120, calculate a probability distribution of a second cost assessment value by the energy source by using the probability distribution of the amount of consumption of the plurality of energy sources provided from the probability distribution calculation unit 220 and by using the second cost coefficient group provided from the second storage unit 120, calculate a probability distribution of a life cycle cost assessment value by adding the probability distribution of the first cost assessment value and the probability distribution of the second cost assessment value, and output the calculated life cycle cost assessment value to the second output unit 420.

The second arithmetic unit 320 may calculate a probability distribution of a life cycle cost assessment value by inputting to Monte Carlo simulation Cost assessment method (CAM) that is a method of assessing a life cycle cost of a building in consideration of an external environment cost in an initial stage of a building project on the basis of Environmental life cycle costing (ELSS) method proposed in SETAC.

The second storage unit 120 stores a building material unit price and an energy source unit price corresponding to the first cost coefficient and the second cost coefficient, and stores at least a unit price per functional unit of the building material included in FIG. 16, that is, the second storage unit 120 stores a price as a factor of a material unit price. A database of the energy source unit price stores at least unit price per functional unit of the energy source include in Table 7 as a factor of the energy source unit price.

As described above, in order to establish the first cost coefficient group and the second cost coefficient group within the second storage unit 120, a cost category in terms of life cycle related to a private cost of the building is investigated, and major cost categories having a significant impact on decision-making of the stakeholders in an initial stage of the building project may be selected.

In addition, for efficiency of calculation, the second arithmetic unit 320 may select major building materials having a high input ratio of direct construction cost, and use a life cycle cost calculation formula using a private cost and an external cost of the building on the basis of Present worth method.

An initial stage of a building project is a stage that has the highest potential to decrease life cycle cost, and predicting a cost input to the building is the most importance factor for determining success or failure of the entire project. Thus, in order to effectively assess a life cycle cost at an initial stage of a building project, selecting major cost categories having major effect on decision making, and thus simplifying information required for assessment are very important.

Meanwhile, in general, when deducing a life cycle cost assessment value, a private cost is a cost input to the building, and is classified into an initial investment cost, an operation cost, an evacuation cost, and other cost. In detail, the private cost is classified into a plan•design cost, a direct construction cost, an operational energy cost, a maintenance cost, a general management cost, an evacuation cost, etc. Herein, among various life cycle cost categories, the second arithmetic unit 320 may perform calculation by excluding from major cost categories a plan•design cost, a general management cost, and a support fund which are related to the building project or building management and which are not dependent on a physical aspect of the building, but it is not limited thereto.

Meanwhile, an evacuation cost is a cost category that is dependent on a physical aspect of the building, but there are many constraints on estimating and presuming the same at an initial stage of a building project, and thus the contribution thereof is relatively low in terms of a life cycle cost of the building. Thus, as major cost categories having major effect on decision making of stakeholders at an initial stage of the building project, direct construction cost (material cost+labor cost+expense), operational energy cost, maintenance cost which are dependent on a physical aspect of the building may be selected.

In addition, the second arithmetic unit 320 may calculate, by using Monte Carlo simulation, a probability distribution of a first cost assessment value by using a direct construction cost unit price related to the building material which is a numerical value corresponding to the first cost coefficient group stored in the second storage unit 120 and by using the probability distribution of amount of input of the plurality of building materials. An example of a calculation formula input to Monte Carlo simulation is as Formula 5 below.

$$CR = \sum_k (Q_k \times U_k \times CC_k) \quad \text{[Formula 5]}$$

Herein, CR represents an assessment result of a direct construction cost of the building, $Q_k$ represents a number of building materials (k), $U_k$ represents a unit conversion coefficient between the number of building materials and a direct construction cost unit price, and $CC_k$ represents a unit price of a direct construction cost of the building material (k).

For a probability distribution of a second cost assessment value, the second arithmetic unit 320 may replace the amount of input of the building material of Formula 5 with the amount of consumption of the energy source, and replace the unit price of the direct construction cost of the building material with a unit price of the energy source for calculation, but it is not limited thereto.

In addition, the second arithmetic unit 320 may perform calculation in consideration of economic effect according to a building life cycle and time elapse when calculating a probability distribution of a life cycle cost assessment value.

In other words, a main object of life cycle cost assessment is to select a design alternative that is economically advantageous by calculating the total cost for various design alternatives at an initial stage of the building project, and thus economical effect according to a time elapse has to be considered. Thus, a cost at present and a cost of future have to be calculated by converting the same into the same timing by using a proper method. Such a conversion method may be classified into Present worth method and Annualized method.

Herein, Present worth method is a method of converting all cost of present and future into a current worth by applying a discount rate, and Annualized method is a method of converting all cost of alternatives into a cost of every year. Accordingly, Present worth method is generally used when estimation periods of the total cost of alternatives are constant, and Annualized method is used when estimation periods of the total cost of alternatives are different from each other. The second arithmetic unit 320 may set a service life of the building to 40 years that is a legal service life regulated in the national Corporate Tax Act, and apply Present worth method.

Costs of the Present worth method are classified into an initial cost, a recursive cost, and a non-recursive cost. The initial cost is a cost input at an initial of the project, the recursive cost is a cost identically generated annually during usage of a product system, and the non-recursive cost is a cost intermittently generated during usage of the product system. As assessment is performed for a direct construction cost (material cost+labor cost+expense), an energy cost, and a maintenance cost which are selected when selecting major cost categories described above, the direct construction cost may be set as the initial cost, the energy cost of the running stage may be set as the recursive cost, and the maintenance cost may be set as the non-recursive cost. In addition, for a discount rate used for converting cost and utility generated at different timings into the same reference, a real interest rate representing changes in values of real money by combining market interest rates and inflation rates may be applied.

The second arithmetic unit 320 may additionally consider at least one external cost, in addition to a private cost being a target of conventional Life cycle assessment method (conventional LCC) when calculating a probability distribution of a life cycle cost assessment value. Accordingly, the second arithmetic unit 320 may calculate a probability distribution of a life cycle cost assessment value by respectively including the private cost of the direct construction cost, the energy cost, and the maintenance cost which are selected as the major cost categories before, and an external cost of the production stage, the construction stage, and the running stage (including maintenance stage) which are calculated as a result of Environmental life cycle assessment (ELCA) using a KOLID to items of expenditure, and inputting Formula 6 below to Monte Carlo simulation.

$$ELCC = (PC_C + EC_C) + \sum_{n=1}^{40} \frac{(PC_E + EC_E) \times (1+i)^n - 1}{i \times (1+i)^n} + \sum_{k=1}^{k} \frac{(PC_M + EC_M)}{(1+i)^{ak}}$$ [Formula 6]

Herein, $PC_C$ and $EC_C$ means a private cost of the direct construction cost and an external cost of the production stage, $PC_E$ and $EC_E$ are a private cost and an external cost of annual energy consumption, $PC_M$ and $EC_M$ mean maintenance costs of the building material, i represents a real interest rate, n represent a service life of the building, k represents a number of repair times of the building material during 40 years of service life, and a represent a repair period of the building material.

For private cost assessment, calculation of a direct construction cost, an energy cost, and a maintenance cost has to be performed. Herein, the direct construction cost may be calculated by multiplying an amount of input of ten major building materials occupying 90 to 99% of the entire direct construction cost and a unit price thereof, the energy cost may be assessed by multiplying an amount of annual energy consumption and a unit price, and the maintenance cost may be assessed by multiplying the amount of input of the building material, a repair rate, and a unit price. Formulas 7 to 9 below respectively represent calculation formulas for private costs of the direct construction cost, the annual energy cost, and the maintenance cost.

$$PC_C = \sum_{i=1}^{10} (Q_{m,i} \times U_{c,i})$$ [Formula 7]

$$PC_E = \sum_{i=1}^{n} (Q_{e,i} \times U_{e,i})$$ [Formula 8]

$$PC_M = \sum_{i=1}^{10} (Q_{m,i} \times U_{c,i} \times R_i)$$ [Formula 9]

Herein, $PC_C$ and $PC_E$ means private costs of the direct construction cost and the amount of the annual energy consumption, $Q_{m,i}$ and $U_{c,i}$ are a quantity of the major building material (i) and the direct construction unit price of the major building material (i), $Q_{e,i}$ and $U_{e,i}$ are an amount of the annual energy consumption of the energy source (i) and a unit price of the energy source (i), and $R_i$ means a repair rate of the major building material (i).

In addition, the second arithmetic unit 320, as a method of considering an external cost of Environmental life cycle cost assessment (ELCC), Willing-to-pay (WTP) method and an end-point level Damage cost method may be used. Herein, the Willing-to-pay method is a method reflecting a price paid by consumers where a virtual market where collective goods are consumed is created and consumers consume the same by paying, and the end-point level Damage cost method is a method of grafting the economic monetization theory of environmental impacts established in the environmental economics into the Life cycle impact assessment (LCIA), and converting the same into a cost.

The second arithmetic unit 320 may apply, on the basis of the end-point level damage cost method, an economic valuation cost of KOLID in which a value of the safety guard (human health, social assets, biodiversity, primary production) is analyzed as a marginal WTD to an external cost when deducing a probability distribution of a life cycle cost assessment value. In other words, the external cost may be calculated by multiplying a damage size by safety guard which is quantitatively assessed by the above Formula 4 and an economic valuation cost. Accordingly, the external cost may be calculated on the basis of the environmental impact assessment results of the production stage, the construction stage, and the running stage (including the maintenance stage) which are calculated in the first arithmetic unit 310, and the external cost may be reflected in a life cycle cost assessment value. Formulas 10 to 12 respectively represent a calculation formula for external costs of the direct construction cost, and annual energy cost, and the maintenance cost.

$$EC_C = \sum_{i=1}^{6}(Q_{m,i} \times I_{m,i} \times F_{ec}) \qquad \text{[Formula 10]}$$

$$EC_E = \sum_{i=1}^{n}(Q_{e,i} \times I_{e,i} \times F_{ec}) \qquad \text{[Formula 11]}$$

$$EC_M = \sum_{i=1}^{6}(Q_{m,i} \times I_{m,i} \times F_{ec} \times R_i) \qquad \text{[Formula 12]}$$

Herein, $EC_C$ and $EC_E$ mean external costs of the direct construction cost and an amount of annual energy consumption, $Q_{m,i}$ and $Q_{e,i}$ mean an amount of input of the major building material (i) and an amount of annual energy consumption of the energy source (i), $I_{m,i}$ and mean damage size coefficients by safety guards according to environmental impact of the major building material (i) and the energy source (i), $F_{ec}$ means an economic valuation cost (refer to Table 10) of the KOLID, and $R_i$ means a repair rate of the major building material (i).

However, the second arithmetic unit 320 may exclude the external cost when calculating a probability distribution of a life cycle cost assessment value to prevent duplicated including of the same from a sustainable building index since the external cost is already reflected in a probability distribution of a life cycle environmental impact assessment value which is calculated in the first arithmetic unit 310 as described above.

The third arithmetic unit 330 may calculate, by using Monte Carlo simulation, a probability distribution of a life cycle social impact assessment value by using the probability distribution of the amount of input of the plurality of building materials which is provided from the probability distribution calculation unit 220 and by using the social impact coefficient group provided from the third storage unit 130, and output the calculated probability distribution of the life cycle social impact assessment value to the third output unit 430.

The third arithmetic unit 330 may calculate, on the basis of Social Life Cycle Assessment (S-LCA) method proposed in UNEP/SETAC, a probability distribution of a life cycle social impact assessment value by inputting Social Impact Assessment Method (SAM) that is a method of assessing a life cycle social impact of the building at an initial stage of the building project to Monte Carlo simulation.

The third storage unit 130 stores social impact coefficients corresponding to the social impact coefficients. For the same, major social topics may be selected among the above social topics, and social impact coefficients related to the same may be stored.

A life cycle social impact refers to the entire or partial social phenomena that are harmful or beneficial resulting from the life cycle of a product or service. As mentioned above, the life cycle social impact may be materialized and quantified by using social topics that are classified into detailed items of impacts on categories of stakeholders related to a product system such as workers, consumers, local community, society, value chain (generating added value during business activities) and social interest.

Meanwhile, for social topics, major social topics corresponding to an assessment target and an assessment object may be selected for calculating a social impact assessment value as numerous issues are present by number of stakeholders. Major social topics may be selected by analyzing social topics provided from United nations environment programme (UNEP), World business council for sustainable development (WBCSD), Global reporting initiative (GRI), and Global social compliance programme (GSCP) which are international institutes, and ISO 26000 (guidance on social responsibility) of the international standardization.

In other words, the third storage unit 130 may store social impact coefficients of a worker category where an assessment method is provided in detail among various stakeholder categories, and store social impact coefficients of major social topics for 11 topics including freedom of association and collective bargaining within the worker category, child labor, fair salary, working hours, forced labor, equal opportunity and discrimination, health and safety, social benefits, training and education, employment relations, and job satisfaction, but it is not limited thereto.

The third arithmetic unit 330 may calculate, by using Monte Carlo simulation and Formula 13 below, a probability distribution of a building life cycle social impact assessment value by using the probability distribution of the amount of input of the major building material and the social impact coefficient of the building material, but it is not limited thereto. Herein, ten building materials of concrete, rebar, glass, concrete brick, insulation, gypsum board, fittings, stone, tile, and paint which are deduced as major building material in economic and environmental aspect of an apartment housing may be selected as major building materials, and the same may be selected as targets of building life cycle social impact assessment. By using a life cycle social impact assessment value (whether or not exceeding 0 and according to a degree thereof) in terms of the building, a social positive or negative impact that is included in the building and a level thereof may be easily determined.

$$SIR = \sum_{k}(Q_k \times U_k \times SIC_k) \qquad \text{[Formula 13]}$$

Herein, SIR may represent a life cycle social impact assessment value of the building, $Q_k$ represents an amount of input of a major building material (k), $U_k$ represents a unit conversion coefficient between the amount of input of the major building material and the social impact coefficient, and $SIC_k$ represents the social impact coefficient of the major building material (k).

The third storage unit 130 stores social impact coefficients corresponding to social impact coefficients of building materials input to the building. For example, a method of deducing a social impact coefficient of ready-mixed concrete is as below.

Herein, according to a principle of S-LCA, site specific data may be preferentially applied, or generic data based on the international or national statistic data may be applied when application of the site specific data is difficult. Particularly, characteristics of labor-management relations by operational types of ready-mixed concrete businesses surveyed on the four ready-mixed concrete workplaces of Table 11 may be re-analyzed and applied as site specific data. In addition, it may be assumed that shipments of ready-mixed concrete workplaces and labor-management relations represent characteristics of the national ready-mixed concrete workplaces.

TABLE 11

| Workplace | Workplace A | Workplace B | Workplace C | Workplace D |
|---|---|---|---|---|
| Operating type | Direct control workplace | Ready-mix concrete specialized company | Subsidiary of cement production company | Subsidiary of cement production company |
| Region | Gyeonggi Yongin | Gyeonggi Yongin | Gyeonggi Bucheon | Gyeonggi Bucheon |
| Production capacity (m$^2$/hour) | 420 | 720 | 360 | 620 |
| Transit-mixer truck | 55 | 87 | 61 | 101 |
| Annual shipments (thousand m$^2$) | 300 | 691 | 344 | 638 |
| Operation rate (%) | 35 | 47 | 47 | 50 |

A reference for social topic assessment is represented as a qualitative assessment reference, and thus as a method of quantitatively establishing a social impact coefficient of ready-mixed concrete through social topic assessment, a method of analyzing on the basis of the Interval scale may be applied. Herein, the method of analyzing on the basis of an interval scale is a method of scaling flow of degree revealed in various situations and contexts within the society from a reference point. The above method is restricted in that a point assigned to the assessment target may not be proportional to performance of the assessment target. However, determining whether or not performance is high or low may be performed according to a certain reference and indirectly comparing the determined performance with other targets may be available.

Herein, values by social topics are based on "0" which mean minimum welfare and profit level in terms of social and ethical point or industry average, and "+2" points may be additionally maximally assigned for a positive impact, and "−2" points may be additionally minimally assigned for a negative impact. In addition, as amounts of ready-mixed concrete generated according to ready-mixed concrete workplaces are different, a weighted average of an assessment point by social topic may be calculated by using an annual shipments of each ready-mixed concrete workplace, and a social impact coefficient may be established based on the same. In other words, when a weighted average or social impact coefficient where an assessment result by social topic is collected as one indicator is equal to or greater than 0, the same may be determined to have a positive social impact, or in case of being smaller than 0, the same may be determined to have a negative social impact. Formula 14 represents a calculation formula for a weighted average of an assessment point of the business.

$$WA_i = \frac{\sum_{j=1}^{4}(S_{i,j} \times Q_j)}{\sum_{j=1}^{4} Q_j} \quad \text{[Formula 14]}$$

Herein, WA$_i$ means a weighted average of an assessment reference (i), means a point of a ready-mixed concrete workplace (j) for the assessment reference (i), and Q$_{i,j}$ means an annual shipment of the ready-mixed concrete workplace (j).

FIGS. 18 to 21 represent results of analyzing a social topic of a worker category for a ready-mixed concrete.

In other words, the freedom of association and collective bargaining of the worker may be assessed by whether or not the company inhibits the establishment of a labor union and collective bargaining for the promote of the rights of the worker, whether or not the negotiations of the workers in collective bargaining are reflected, and whether the representative worker is disciplined, etc. A labor union to exercise the rights of workers is not present in workplaces A and B, and is present in workplaces C and D. Accordingly, an organization representing the benefits of the workers is not present in the workplaces A and B, and collective bargaining is not achieved. In the workplace C, a labor union is present and there are some collective bargaining activities, but periodic activities transferring opinions of the worker are not achieved. Meanwhile, in the workplace D, collective bargaining activities through a labor union have been actively carried out, and labor-management councils are guaranteed regularly to ensure workers' rights to speak. Accordingly, "−2" points is assigned to each of the workplaces A and B, "0" points is assigned to the workplace C, and "+2" points is assigned to workplace D. A weighted average based on the shipments may be calculated as "−0.36" points by Formula 14.

Child labor may be assessed through management of child labor prevention and operation of a compliance system and whether or not documents certifying the age of workers are kept. According to a report released by the United nations international children's emergency fund (UNICEF) in 2013 on the status of child labor in 104 countries all over the world, all businesses in Korea are in compliance with child labor prevention. Accordingly, "+2" points may be assigned to all ready-mixed concrete workplaces A, B, C, and D, and a weighted average based on the shipments may be calculated as "+2.00" points.

Fair salary may be assessed through whether or not a wage of the minimum legal standard and additional living expenses are provided. In a workplace A, being a typical small and medium-sized businesses, all workers are paid the legal minimum wage, but no additional living expenses are paid. Meanwhile, in workplaces B, C, and D, belonging to a large company or group company of a large company, all workers are paid the legal minimum wage, and various living expenses such as factory allowance, qualification allowance, communication cost, tuitions, etc. are provided. Accordingly, for the workplace A, "0" points, for workplaces B, C, and D, "+2" points are assigned, and a weighted average based on shipments may be calculated as "+1.70" points.

Working hours may be assessed on the basis of compliance with working hours of legal standards and whether or not overtime pay is paid. In the workplace A, the 40-hour workweek has been introduced, but due to the nature of the industry, workers work from dawn until late in the evening during the normal working week, and usually go to work on Sundays and other statutory holidays. In the workplace B, C, and D, the 40-hour workweek has been introduced as the workplace A, workers work on holidays depending on the operation status of the factory. However, in case of the holiday, workers' can take a compensatory day off or every other week off in consideration of the conditions of workplace. Accordingly, for the workplace A, "−2" points, and for workplace B, C, and D, "−1" points are assigned, and a weighted average based on shipments is calculated as "−1.15" points.

Forced labor may be assessed through whether or not workers' documents (passports, residence permission etc.) or wages (salary) are forcibly attributed to the company, and whether or not a reasonable working condition including the worker's right to quit the job early is satisfied. As shown in the Korean labor rights report investigated in 2011 by the US Department of Labor (U. S. DOL, United States Department of Labor), forced labor is not done in all workplaces in the country, and employers and suppliers that are directly related to products comply with Labor unions and labor relations adjustment law, and strive to prevent forced labor. Accordingly, for all ready-mixed concrete workplaces A, B, C, and D, "+2" points is assigned and a weighted average based on shipments is calculated as '+2.00" points.

Equal opportunities and discrimination may be assessed thorough whether or not an objection system related to discrimination is operating and whether or not an equal compensation for the equal business value is paid. According to the Korean labor rights reports investigated in 2011 by the US Department of Labor (U. S. DOL, United States Department of Labor), since there is no discrimination against workers in all domestic workplaces, for all ready-mixed concrete workplaces A, B, C, and D, "+2" points is assigned and a weighted average based on shipments may be applied as '+2.00" points.

Health and safety may be assessed through whether or not education related to health and safety is provided, and whether or not a job responsibility system for health and safety is defined. According to the domestic Occupational safety and health law, the workplaces A, B, C, and D perform periodic health and safety prescribed by the laws of the Ministry of Employment and Labor, and appoint a safety and health manager, a supervisor, a safety manager, etc. for managing health and safety of workers. However, an additional point is not assigned as it is difficult to determine whether or not workers participate in designing, developing, and reviewing of an education program for health and safety and whether or not a disaster level and a reduction target of the workplace is established. Accordingly, for all ready-mixed concrete workplaces A, B, C, and D, "0" points is assigned and a weighted average based on shipments may be applied as '0.00" points.

Social benefits may be assessed through whether or not social benefits specified in the Labor Standards Act which are severance pay, disability allowance, dependency allowance, survivor benefits, etc. and whether or not other additional social benefits are provided. In the workplace A, only the social benefits provided in the Labor Standards Act are given to the workers, and there are almost no other benefits. However, in the workplaces B, C, and D, in addition to the social benefits specified in the Act, benefits such as factory allowance, job title allowance, qualification allowance, financial aid, etc. are provided to all workers. Accordingly, for the workplace A, "0" points, and for the workplaces B, C, and D, "+2" points is assigned, and a weighted average based on shipments may be calculated as "1.70" points.

Training and education may be assessed through whether or not training and education is performed for workers. In the workplace A, a training system for the company is not established, and only the minimum statutory training specified in the KS regulations is carried out. However, in the workplace B, C, and D, periodic online and offline training according to position and job is operated. Further, in addition to training on job duties, training on various cultures and languages is provided by operating a training credit system. Accordingly, for the workplace A, "−1" points, and for workplaces B, C, and D, "+2" points are assigned, and a weighted average based on shipments may be calculated as "+1.54'" points.

Employment relations may be assessed through whether or not an employment contract is written and a type of employment of a worker. In all workplaces A, B, C, and D, employment contracts are written based on the Labor Standards Law, and an employment ratio of full-time job is 25% or more. Accordingly, for all ready-mixed concrete workplaces A, B, C, and D, "+2" points are assigned and a weighted average based on shipments may be applied as '+2.00" points.

Job satisfaction may be assessed through a turnover of a worker. In the workplace A, an annual turnover is 15 to 20%, in the workplace B, an annual turnover is 8.3 to 15%. However, in the workplaces C and D, a length of service of a worker is 15 to 20 years that is very long, and a turnover is very low. Accordingly, for the workplace A, "−1" points, for the workplace B, "0" points and for the workplace C and D, "+2" points are assigned, and a weighted average based on shipments may be calculated as "+0.84" points.

Social impact coefficients of the building materials stored in the third storage unit 130 may be calculate by dividing the sum of scores of the major social topics of the worker category by the sum of the scale. Herein, when a social impact coefficient of the building material exceeds 0, the corresponding building material is represented to have a positive social impact, when the coefficient is smaller than 0, the corresponding building material is represented to have a negative impact.

$$SIC_i = \frac{\sum_{j=1}^{11} ST_{i,j}}{22}$$

[Formula 15]

Herein, $SIC_i$ represents a social impact coefficient of a building material (i), and $ST_{i,j}$ means a point of a social topic (j) for the building material (i).

Herein, for social topics of ready-mixed concrete described above, according to Formulas 14 and 15, the total point of the social topic and the social impact coefficient are respectively calculated as 12.27 points, and 0.56 points and thus the ready-mixed concrete may be analyzed as a building material having positive social impact. Herein, a functional unit of the ready-mixed concrete is represented as a cubic meter ($m^3$), and thus a unit of the social impact coefficient may be defined as a score per cubic meter (score/$m^2$).

Further, in addition to the third storage unit 130 may store social impact coefficient values of other social topics the worker category which are calculated by Formula 16.

$$SIC_i = A_i \times \left( \alpha \times \left( \frac{\sum_{j=1}^{n}(ST_{i,j} \times WF_j)}{2n} \right) + \beta \times \left( \frac{\sum_{k=1}^{n}(ST_{i,k} \times WF_k)}{2n} \right) + ... \right)$$

[Formula 16]

Herein, $SIC_i$ means a social impact coefficient of a building material (i), $A_i$ means a weighting factor of the building material (i) in consideration of a functional unit by building material, $ST_{i,j}$ means a point of a social topic (j) of the worker category for the building material (i), $WF_j$ is a weighting factor of the social topic (j) of the worker category, n is a number of social topics by stakeholder category, $ST_{i,k}$ means a point of a social topic (k) of the consumer category for the building material (i), $WF_k$ is a weighting factor of the social topic (k) of the consumer category, α and β mean weighting factors of the stakeholder category. Social impact for the local community, the society, and the value chain may be established by expanding the same method.

The first output unit 410 may deduce a probability distribution of an environmental impact index by dividing the reference environmental impact assessment value stored in the first storage unit 110 by the probability distribution of the life cycle environmental impact assessment value calculated in the first arithmetic unit 310, and output the deduced probability distribution of the environmental impact index to a display device of the user and to the probability distribution output unit 500.

The second output unit 420 may deduce a probability distribution of a cost index by dividing the reference cost assessment value stored in the second storage unit 120 by the probability distribution of the life cycle cost assessment value calculated in the second arithmetic unit 320, and output the deduced probability distribution of the cost index to the display device of the user and to the probability distribution output unit 500.

The third output unit 430 may deduce a probability distribution of a social impact index by dividing the probability distribution of the life cycle social impact assessment value calculated in the third arithmetic unit 330 by the reference environmental impact assessment value stored in the third storage unit 130, and output the deduced probability distribution of the social impact index to the display device of the user and to the probability distribution output unit 500.

The probability distribution output unit 500 may deduce, by using Monte Carlo simulation, a probability distribution (P-SBI) of a sustainable building index by applying the probability distribution (P-EI) of the environmental impact index provided from the first output unit 410, the probability distribution (P-CI) of the cost index provided from the second output unit 420, and the probability distribution (P-SI) of the social impact index provided from the third output unit 430 to the Formula 17, and output the deduced probability distribution of the sustainable building index to the display device of the user. Herein, it is preferable to deduce the probability distribution of the environmental impact index, the probability distribution of the cost index, the probability distribution of the social impact index, and the probability distribution of the sustainable building index by using single Monte Carlo simulation analysis, but it is not limited thereto.

$$P\text{-}SBI = \alpha P\text{-}EI + \beta P\text{-}CI + \gamma P\text{-}SI \qquad \text{[Formula 17]}$$

Herein α, β, and γ respectively represent weighting factors of P-EI, P-CI, and P-SI. The weighting factors α, β, and γ may be respectively set to ⅓ (α=β=γ=⅓) so as to maintain balance of life cycle environmental impact, life cycle cost, and life cycle social impact of the building, but may be adjusted according to the assessment target and the feature of the building, and according to the tendency of the building subject. However, the total sum of α, β, and γ has to be fixed to 1 (α+β+γ=1).

In order to represent the probability distribution of the environmental impact index, the probability distribution of the cost index, and the probability distribution of the social impact index which constitute the probability distribution of the sustainable building index to a single probability distribution, for weighting factors in terms of environmental, economical, and social aspects, weighting factors differing in terms of environmental, economical, and social aspects according to the target and object of sustainability assessment may be applied. Meanwhile, average values of weighting factors may be set as 0.319, 0.339, and 0.342 according to the terms of environmental, economical, and social aspects. However, the weighting factor may be adjusted according to the assessment target and the feature of the building, and according to the tendency of the building subject, but it is not limited thereto.

A building life cycle sustainability assessment device of the present invention may deduce a probability distribution of a sustainable building index by using Probabilistic sustainability assessment model (PSA Model) using a probabilistic method usable at an initial stage of the building project on the basis of EAM, CAM, SAM, and the Life cycle sustainability assessment (LCSA) method, Life Cycle Sustainability Assessment).

In addition, for reference buildings for setting the reference environmental impact assessment value, the reference cost assessment value, and the reference social impact assessment value which are stored in the first storage unit 110, the second storage unit 120, and the third storage unit 130, buildings corresponding to top 10%, 20%, and 30% by performing life cycle environmental impact assessment, life cycle cost assessment, life cycle social impact assessment for 38 apartment housing complexes recently constructed domestically may be selected.

The probability distribution of the environmental impact index, the probability distribution of the cost index, and the probability distribution of the social impact index which are deduced in the first output unit 410, the second output unit 420, and the third output unit 430 may be calculated by Formulas 18 to 20 by applying a relative efficiency method so that life cycle environmental impact, the life cycle cost, and the life cycle social impact of the reference building, are compared with the assessment result of the life cycle environmental impact, the life cycle cost, the life cycle social impact of the evaluated building which are calculated in the EAM, the CAM, and the SAM.

Herein, the probability distributions of the environmental impact assessment value and the life cycle cost assessment value which are calculated in the first arithmetic unit 310 and the second arithmetic unit 320 show better performance as the numerical values thereof are smaller. Accordingly, for the environmental impact index and the cost index, the probability distributions that are the assessment results of the life cycle environmental impact assessment value, and the life cycle cost assessment value of the evaluated building are positioned in the denominator, and the reference environmental impact assessment value and the reference cost assessment value of the reference building are positioned in the numerator.

Figure 5:
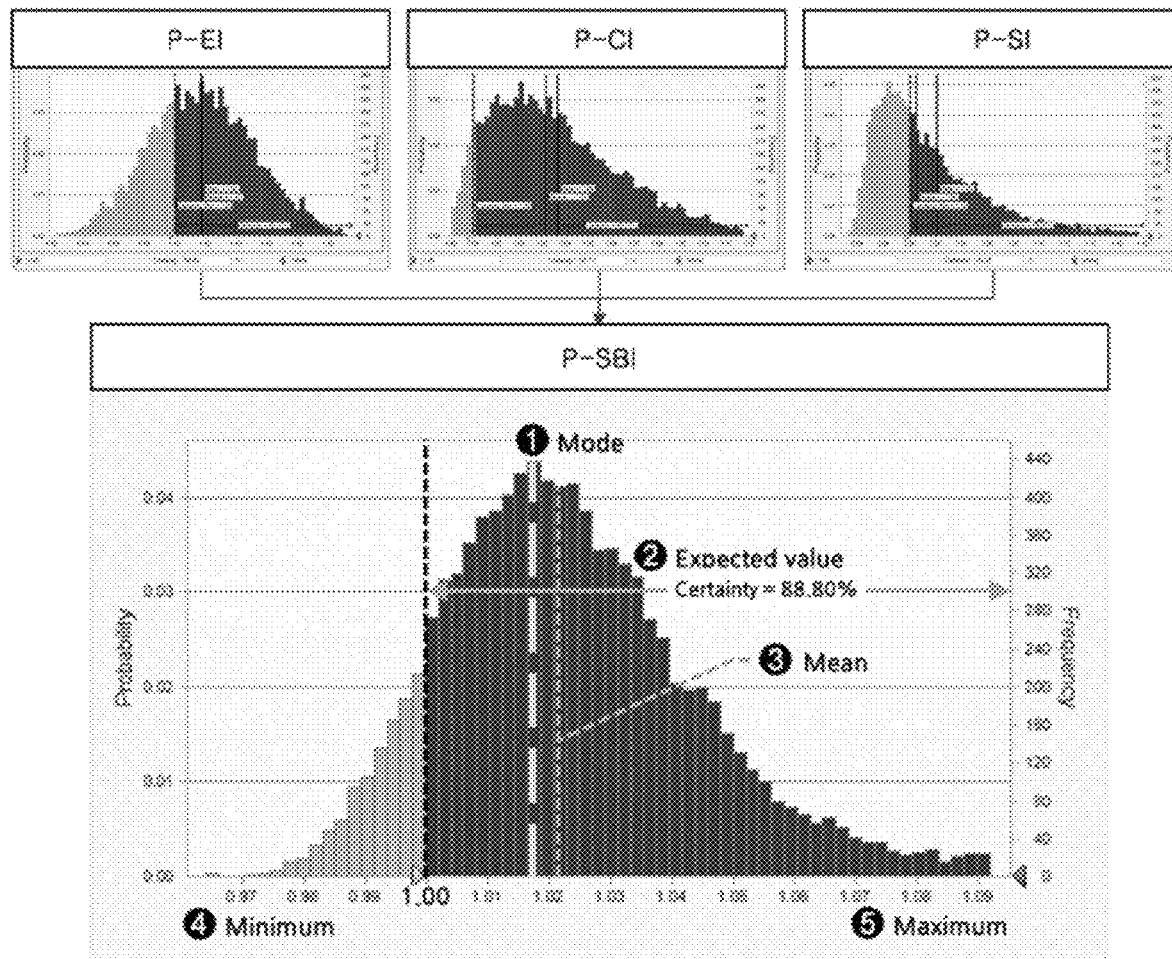
FIG. 5 is a view showing an assessment configuration of a building life cycle sustainability assessment device using probabilistic analysis method of the present invention.

Meanwhile, the life cycle social impact assessment value within the probability distribution calculated in the third arithmetic unit 330 represents social performance of the building, and a size of the life cycle social impact assessment value within the probability distribution and the social performance of the building show the tendency of proportion. Accordingly, the probability distribution of the life cycle social impact assessment value of the evaluated building is positioned in the numerator, and the reference social impact assessment value is positioned in the denominator. As shown in FIG. 5, based on 1, an area of each probability distribution of P-EI, P-CI, and P-SI positioned at an area exceeding 1 means a probability of environmental, economical, and social levels of the evaluated building to be higher than the reference building, and an area positioned at an area below 1 means a probability of the same to be lower than the reference building. In the above aspect, an area of a portion positioned where P-SBI exceeds 1 means that a probability of a sustainability level of the evaluated building is higher than that of the reference building, and an area of a portion positioned where P-SBI is smaller than 1 means that the probability is lower than that of the reference building. However, herein, all the probabilistic assessment results of the evaluated building and the reference building on the life cycle environmental impact and the life cycle costs, are calculated on the criteria of ratio scale, and thus P-EI and P-CI mean a performance ratio for the evaluated building in comparison with the reference building. However, P-SI is an assessment result of a life cycle social impact based on an interval scale, and thus P-SI means an indirect high-and-low of the performance rather than meaning an absolute performance ratio of the evaluated building and the reference building.

$$P\text{-}EI = \frac{R_{EAM,R}}{PR_{EAM,E}} \qquad \text{[Formula 18]}$$

$$P\text{-}CI = \frac{R_{CAM,R}}{PR_{CAM,E}} \qquad \text{[Formula 19]}$$

$$P\text{-}SI = \frac{R_{SAM,E}}{PR_{SAM,R}} \qquad \text{[Formula 20]}$$

Herein, P-EI, P-CI, and P-SI respectively represent a probabilistic environmental impact index, a probabilistic cost index, and a probabilistic social impact index of the building, $R_{EAM,R}$, $R_{CAM,R}$, and $R_{SAM,R}$ respectively represent reference building assessment results using the EAM, the CAM, and the SAM, and $PR_{EAM,E}$, $PR_{CAM,E}$, and $PR_{SAM,E}$ represent assessment results of the probabilistic method for the evaluated building calculated by using the probability distribution of the major building material, and the Monte Carlo simulation through the EAM, the CAM, and the SAM.

For reference buildings for setting the reference environmental impact assessment value, the reference cost assessment value, and the reference social impact assessment value which are stored in the first storage unit 110, the second storage unit 120, and the third storage unit 130, various references may be set according to an object of sustainability assessment. Accordingly, in order to provide various levels of reference buildings, assessment of life cycle environmental impact, life cycle cost, and life cycle social impact is performed for 38 apartment housing complexes domestically designed and constructed from last 2005 to 2014. In addition, according to a baseline calculation reference of AM0091 (Energy efficiency technologies and fuel switching in new and existing buildings) registered in UNFCCC as a method for Clean development mechanism (CM) of Masdar City, buildings with assessment results corresponding to the top 20% and in addition, buildings with assessment results corresponding to the top 10% and 30% may be set as reference buildings. Table 12 below shown an example of a configuration of an apartment housing complex assessed as a reference building.

TABLE 12

| Structure | | Year of building design | | Number of units | |
|---|---|---|---|---|---|
| Wall structure | 23 | 2005~2008 | 8 | Under 500 units | 13 |
| Rigid frame structure | 11 | 2009~2011 | 16 | 500~1,000 units | 10 |
| Flat plate structure | 4 | 2012~2014 | 14 | Over 1,000 units | 15 |
| Total | 38 | Total | 38 | Total | 38 |

Bill of quantities (BOQ) of the apartment housing complex set as samples for assessment of life cycle environmental impact, life cycle cost, and life cycle social impact for the 38 apartment housing complexes may be received from respective construction companies, and quantities of ten major building materials may be deduced by analyzing the same. Accordingly, assessment of environmental impact, direct construction cost, and maintenance cost, life cycle social impact of a production stage, a construction stage, and a demolition stag of the building may be performed. Meanwhile, by analyzing energy consumption according to an area of a household (46 m$^3$, 59 m$^2$, 84 m$^3$) constituting the apartment housing by using a statistical method, assessment of environmental impact, operational energy cost in a running stage may be performed by applying data of Table 13 below as amounts of primary energy consumption and secondary energy consumption per unit area. Herein, by classifying areas of exclusive use space of the households constituting the apartment housing complex into equal to or less than 46 m$^3$, greater than 46 m$^2$ and smaller than 59 m$^3$, and equal to or greater than 84 m$^2$, respective coefficients of the amount of the primary energy consumption for areas of exclusive use space of 46 m$^3$, 59 m$^3$, and 84 m$^2$ may be applied.

TABLE 13

| | Exclusive | Electricity | | | | City gas | | | |
|---|---|---|---|---|---|---|---|---|---|
| Classification | area | Lighting | Appliances | Cooling | Subtotal | Heating | hot water | Subtotal | Total |
| secondary energy comsumption [kWh/m$^2$ – yr] | 46 m$^2$ | 10.90 | 52.42 | 15.64 | 78.96 | 82.00 | 51.69 | 133.69 | 212.65 |
| | 59 m$^2$ | 9.64 | 4.57 | 18.33 | 70.54 | 121.77 | 60.45 | 182.22 | 252.77 |
| | 84 m$^2$ | 10.14 | 36.43 | 14.53 | 61.10 | 111.70 | 56.61 | 168.31 | 229.41 |
| primary energy comsumption [kWh/m$^2$ – yr] | 46 m$^2$ | 29.98 | 114.16 | 43.01 | 187.15 | 90.20 | 56.86 | 147.06 | 364.20 |
| | 59 m$^2$ | 26.51 | 117.07 | 50.41 | 193.99 | 133.95 | 66.50 | 200.45 | 394.43 |
| | 84 m$^2$ | 27.89 | 100.18 | 39.96 | 168.03 | 122.87 | 62.27 | 185.14 | 353.17 |

Figure 6:
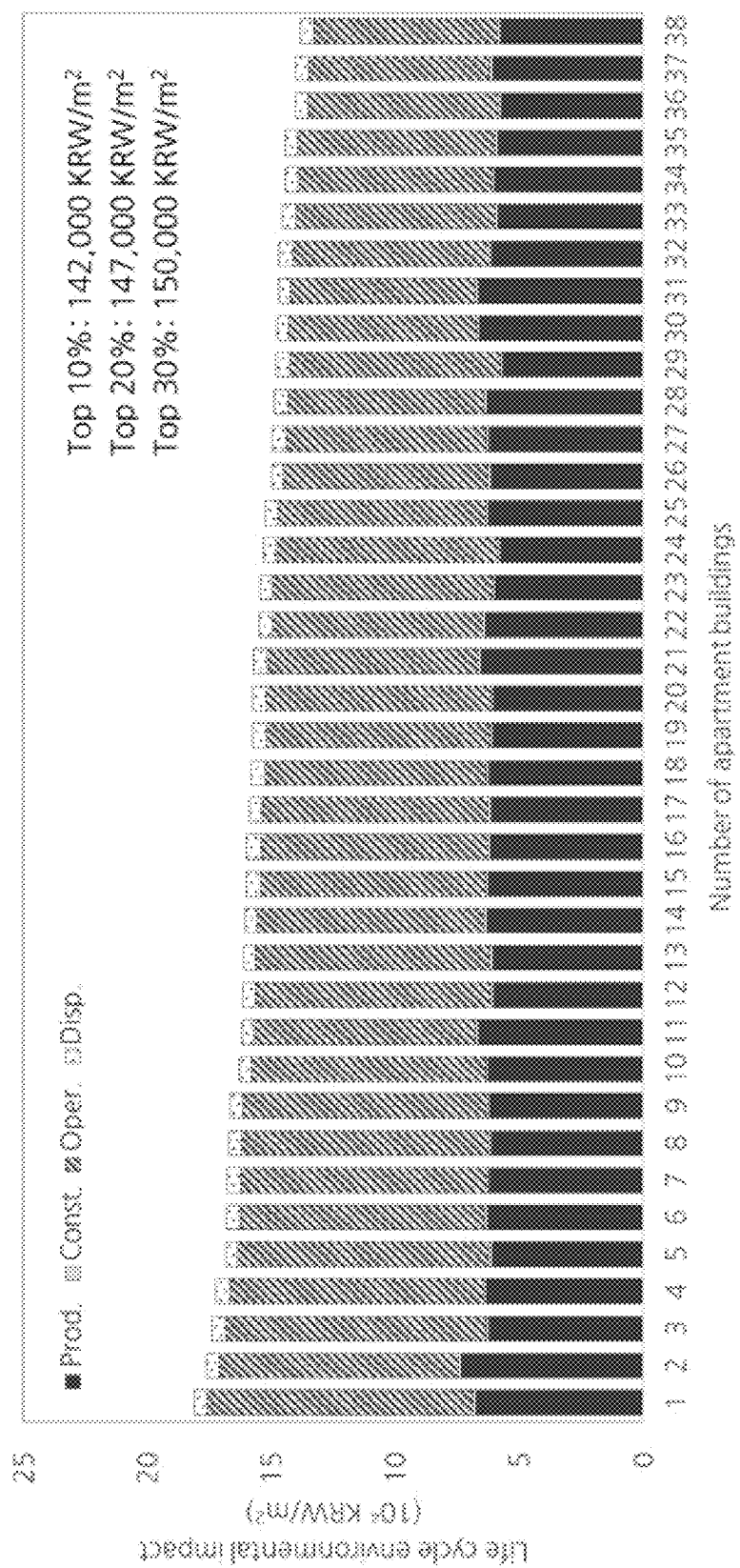
FIG. 6 is a view of a graph showing a life cycle environmental impact assessment result of a sample apartment housing complex.

FIG. 6 is a view of a graph showing a life cycle environmental impact assessment result of a sample apartment housing complex. According to FIG. 6, life cycle environmental impact (monetization of environmental impact by using a KOLID) of the sample building is calculated at least 138000KRW/m$^2$ and upto a maximum 1810000KRW/m$^2$ per unit area of exclusive use space. Herein, life cycle environmental impact assessment results corresponding to the top 10%, 20%, and 30% among sample apartment housing complexes are respectively deduced as 142000KRW/m$^2$, 147000KRW/m$^2$, and 150000KRW/m$^2$ per unit area of exclusive use space, the same may be set as impact assessment values ($R_{EAM,R}$) of reference buildings.

Figure 7:
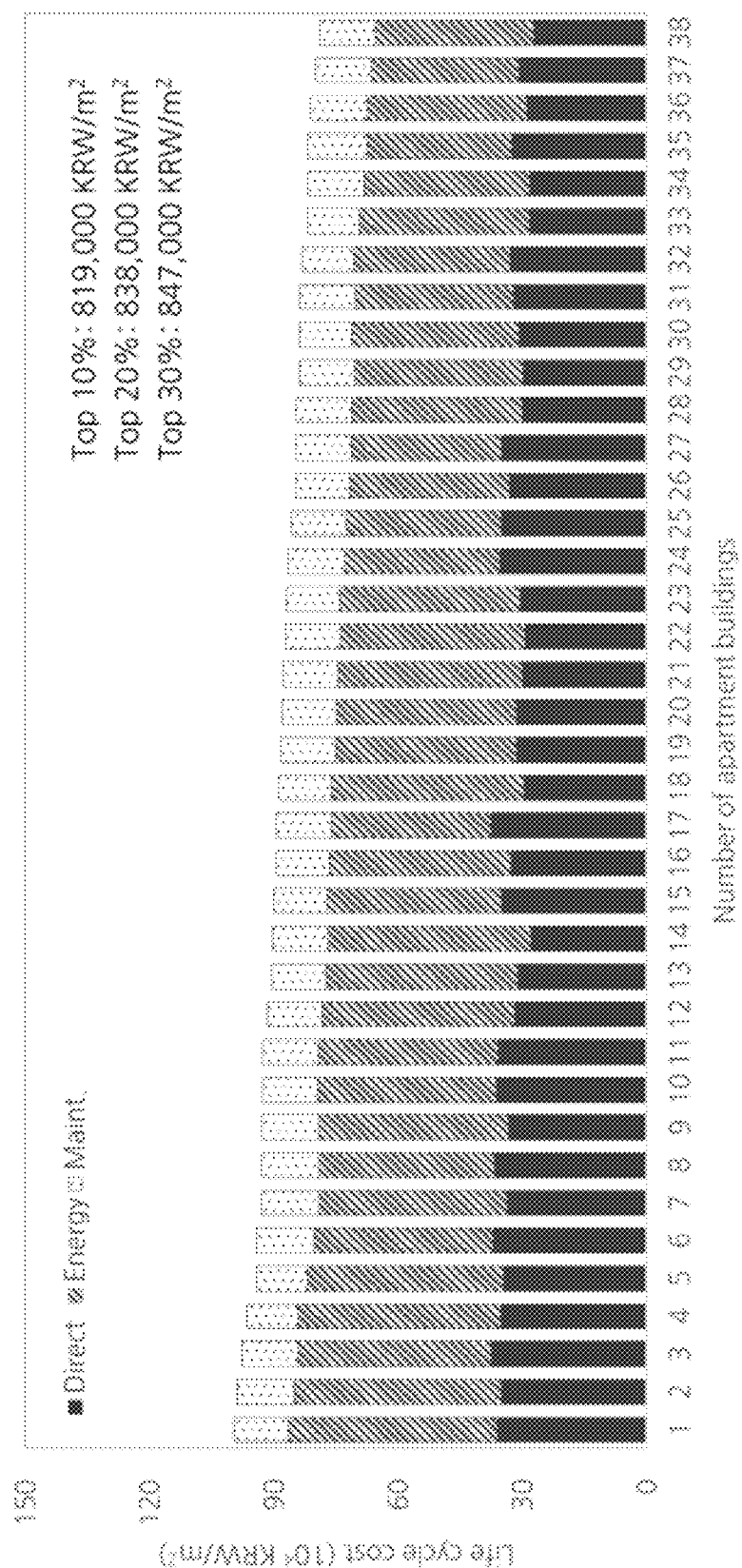
FIG. 7 is a view of a graph showing a life cycle cost assessment result of a sample apartment housing complex.

FIG. 7 is a view of a graph showing a life cycle cost assessment result of a sample apartment housing complex. According to FIG. 7, a life cycle cost of a sample building is calculated at least 789000KRW/m$^2$ upto a maximum 996000KRW/m$^2$ per unit area of exclusive use space. Herein, life cycle cost assessment results corresponding to the top 10%, 20%, and 30% among sample apartment housing complexes which are 819000KRW/m$^2$, 838000KRW/m$^2$, 847000KRW/m$^2$ per unit area of exclusive use space are set as reference cost assessment value ($R_{CAM,R}$) of reference buildings.

Figure 8:
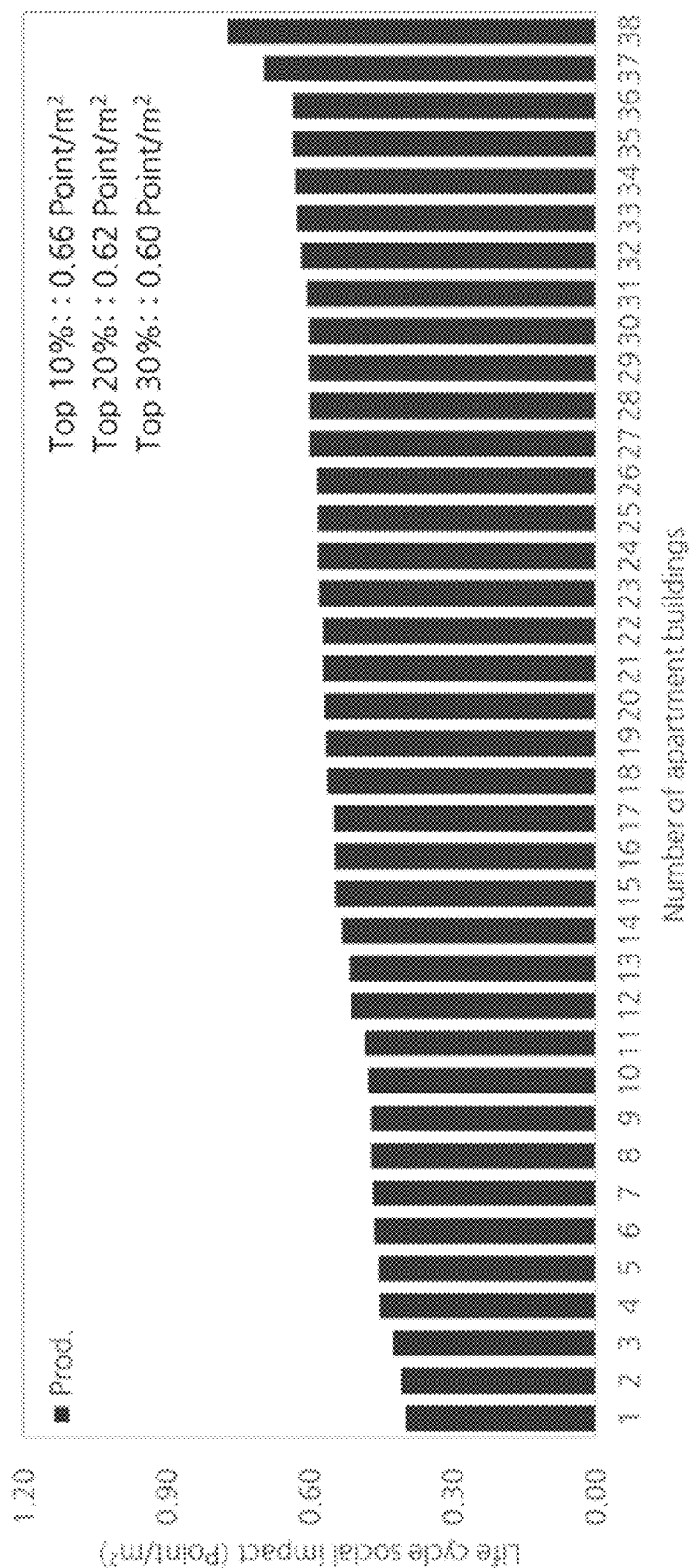
FIG. 8 is a view of a graph showing a life cycle social impact assessment result of a sample apartment housing complex.

FIG. 8 is a view of a graph showing a life cycle social impact assessment result of a sample apartment housing complex. According to FIG. 8, a life cycle social impact of a sample building is calculated at least 0.39 point/m$^2$ and upto a maximum 0.77 point/m$^2$. Herein, life cycle social impact assessment results corresponding to 10%, 20%, and 30% among sample apartment housing complexes are deduced as 0.66 point/m$^2$, 0.62 point/m$^2$, 0.60 point/m$^2$ per unit area of exclusive use space, and the same are set as reference social impact assessment values ($R_{SAM,R}$) of reference buildings.

FIG. 4 is a view showing system of a building life cycle sustainability assessment device using a probabilistic analysis method of the present invention. Overall operation of the building life cycle sustainability assessment device using the probabilistic analysis method of the present invention will be described below.

In an input stage, levels of reference buildings are set in terms of environmental, economical, and social aspects, and information required for life cycle sustainability assessment of an evaluated building is input. Herein, based on a building design document, a construction summary including a gross area, a floor area, an area of exclusive use space, etc. of the evaluated building are input, and an amount of annual energy consumption which is assessed by using an energy simulation tool is input by classifying the same by energy source.

In a calculation stage, by using information input in the input stage, a probability distribution of ten major building materials (ready-mixed concrete, rebar, glass, concrete brick, insulation, gypsum board, window frames, stone, tile, paint) are deduced.

Herein, for ready-mixed concrete and rebar of a residential building, a probability distribution of an amount of input of building material per area of exclusive use space is deduced according to an a structure form such as wall structure, Rahmen structure, and flat plate structure and according to a building form such as flat-type, tower-type, and mixed-type. For glass, concrete brick, insulation, gypsum board, window frames, stone, tile, and paint, a probability distribution is calculated by using the same method used for ready-mixed concrete and rebar described above. In addition, for amounts of input of ready-mixed concrete and rebar of an annexed building, a probability distribution may be deduced according to a floor area of the annexed building, and for ready-mixed concrete and rebar of a underground parking lot, a probability distribution of an amount of input of building material per area of exclusive use space is determined according to the total number of households of the apartment housing complex.

Figure 9:
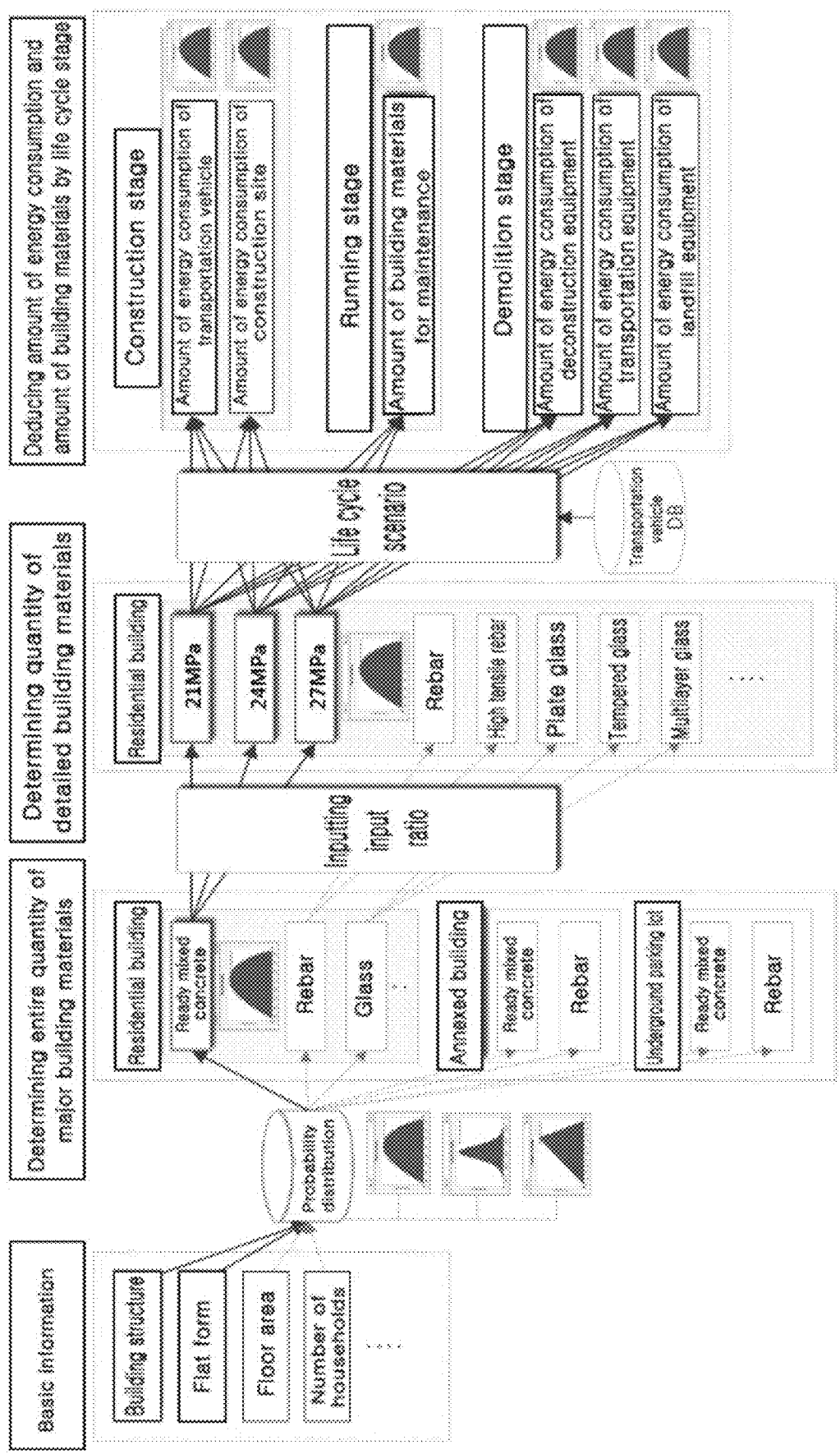
FIG. 9 is a view of a life cycle scenario of a building life cycle sustainability assessment device using a probabilistic analysis method according to an embodiment of the present invention.

Probability distributions of the amounts of input of detailed building materials which are deduced as above are used as quantity information for performing assessment of a production stage of the building, and amounts of energy consumption and quantities of building materials for performing assessment of a construction stage, and a demolition stage etc. are deduced in a probability distribution form by using a life cycle scenario established as shown in FIG. 9. Based on information of the quantities of the building materials and the amounts of energy consumption which are deduced as above, assessment of a life cycle environmental impact, a life cycle cost, and a life cycle social impact of the building is sequentially performed, and assessment using Monte Carlo simulation as a tool is finally performed.

In the production stage, assessment for an environmental impact according to production of building materials is performed by using probability distributions of quantities of six major building materials and environmental impact coefficients of the building materials (refer to Formula 3).

In the construction stage, by using a life cycle scenario established in the present study, probability distributions of energy consumptions for construction of the building and transportation vehicles for transportation of the six major building materials are calculated, and assessment of an environmental impact is performed by using environmental impact coefficients of energy sources. Herein, an amount of energy consumption of the transportation stage is calculated on the basis on the amount of input of six major building materials and fuel consumption information by transportation vehicle, and an amount of energy consumption of the construction stage is calculated on the basis of a gross area of the evaluated building, but may be calculated on the basis of an area of exclusive use space, and it is not limited thereto.

In the running stage, assessment of operational energy consumption of the building and an environmental impact of the major building materials input in a maintenance process is performed. Herein, for a probability distribution of the operational energy consumption, assessment of an environmental impact is performed by using the amount of annual operational energy consumption which is input in the input stage and a service life of the building which is 40 years, and environmental impact coefficients of energy sources. For assessment of the maintenance process, probability distributions of quantities of building materials that are newly input are calculated by using a repair period and a repair rate of the major building materials, and assessment of the environmental impact is performed by using environmental impact coefficients of the building materials.

In the demolition stage, by using a life cycle scenario, probability distributions of amounts of energy consumption in the whole stages of the equipments used during a deconstruction process, a waste material transportation process, and a waste material landfill process are calculated, and assessment of an environmental impact may be performed by using environmental impact coefficients of energy sources. Herein, the probability distribution of the amount of energy consumption of the deconstruction process is calculated by using the total weight of the amount of inputs of six major building materials (the amount of waste materials is set to be equal to the amount of building materials input in the production stage) and by using fuel consumption of Backhoe (1.0 m$^3$)+Giant breaker (0.7 m$^3$) which are dismantling equipments. The probability distribution of the amount of energy consumption in the transportation process is calculated by using the total weight of the waste material and a fuel consumption of a 15 ton truck. The amount of energy consumption in the landfill process may be calculated by using a recycle rate by major building material and a fuel consumption of Dozer (D8N, 15 PL, 6 PL)+Compactor (32 ton) which are landfill equipments.

Assessment of a life cycle cost is performed by using the probability distributions of amounts of input of ten major building materials input in the input stage and the probability distribution of amount of annual operational energy consumption.

In the production stage and the construction stage, assessment of a direct construction cost is performed by using the probability distributions of the quantities of ten major building materials and a unit price of the direct construction cost by building material.

In the running stage, assessment of an operational energy cost based on the probability distribution of amount of operational energy consumption of the building and of a maintenance cost on the basis of major building materials input during the maintenance stage of the building is performed. Herein, assessment of the operational energy cost is performed by using the probability distribution of the amount of annual operational energy consumption which is input before, a service life of the building which is 40 years, and unit price information of the energy source and a real discount rate. For the maintenance cost, a probability distribution of a quantity of building material input during the maintenance stage is calculated by using a repair period and a repair rate of the major building materials, and assessment of the maintenance cost is performed by using information of a unit price of the direct construction cost of the building material.

Assessment of a life cycle social impact of the building is performed, by using Formula 15, by using the probability distribution of the quantity of ready-mixed concrete input in the input stage and a social impact coefficient of the ready-mixed concrete established in the present study.

In an output stage, by using Formulas 17 to 20, P-EI, P-CI, and P-SI of the evaluated building are calculated on the basis of the probabilistic life cycle environmental impact, the probabilistic life cycle cost, and the probabilistic life cycle social impact assessment result of the evaluated building which are calculated in the calculation stage and the levels of the reference buildings set in the input stage, and output P-SBI where P-EI, P-CI, and P-SI are integrated.

Figure 2:
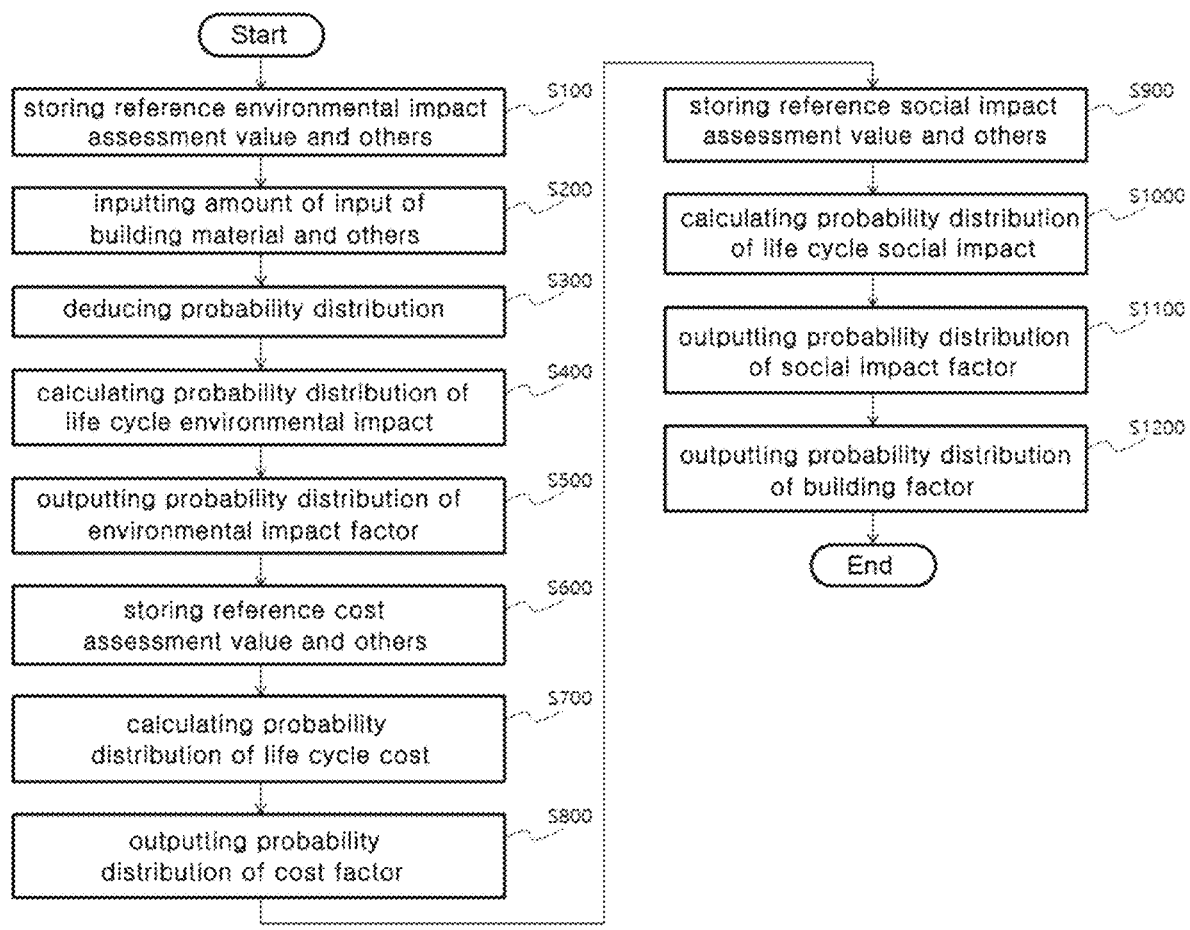
FIG. 2 is a view of a flowchart showing a building life cycle sustainability assessment method using a probabilistic analysis method according to an embodiment of the present invention.

FIG. 2 is a view showing a building life cycle sustainability assessment method using a probabilistic analysis method of the present invention, and the building life cycle sustainability assessment method of the present invention will be described with reference to FIGS. 1 and 2.

First, in step S100, a reference environmental impact assessment value of a reference building, a first environmental impact coefficient group obtained by digitizing an environmental impact degree per input unit of a plurality of building materials, and a second environmental impact coefficient group obtained by digitizing an environmental impact degree per consumption unit of a plurality of energy sources are stored in the first storage unit 110.

Then, in step S200, area information of a building, an amount of input of the plurality of building materials, and an amount of consumption of the plurality of energy sources are input through the input unit 210.

Herein, in step S300, for the amount of input of the plurality of building materials and the amount of consumption of the plurality of energy sources, the probability distribution calculation unit 220 deduce a probability distribution of the amount of input of the plurality of building materials and a probability distribution of the amount of consumption of the plurality of energy sources according to a set value that is stored in advance on a form of a probability distribution of the building material and the energy source according to the area information of the building.

Then, in step S400, the first arithmetic unit 310, calculates, through Monte Carlo simulation, a probability distribution of a first environmental impact assessment value by the building material by using the probability distribution of the amount of input of the plurality of building materials input from the probability distribution calculation unit 220 and by using first environmental impact coefficient group stored in the first storage unit 110, calculates a probability distribution of a second environmental impact assessment value by the energy source by using the probability distribution of the amount of consumption of the plurality of energy sources and by using the second environmental impact coefficient group, and calculates a probability distribution of a life cycle environmental impact assessment value by adding the probability distribution of the first environmental impact assessment value and the probability distribution of the second environmental impact assessment value.

In step S500, the probability distribution output unit 500 deduces a probability distribution of an environmental impact index by dividing the reference environmental impact assessment value stored in the first storage unit 110 by the calculated probability distribution of the life cycle environmental impact assessment value, and outputs the deduced probability distribution of the environmental impact index.

In addition, in step S600, a reference cost assessment value of the reference building, a first cost coefficient group obtained by digitizing a required cost degree per input unit of the plurality of building materials, and a second cost coefficient group obtained by digitizing a required cost degree per consumption unit of the plurality of energy sources may be stored in the second storage unit 120.

Then, in step S700, the second arithmetic unit 320 calculates, by using Monte Carlo simulation, a probability distribution of a first cost assessment value by the building material by using the probability distribution of the amount of input of the plurality of building materials which is input from the probability distribution calculation unit 220 and by using the first cost coefficient group stored in the second storage unit 120, calculates a probability distribution of a second cost assessment value by the energy source by using the probability distribution of the amount of consumption of the plurality of energy sources and the second cost coefficient group, and calculates a probability distribution of a life cycle cost assessment value by adding the probability distribution of the first cost assessment value and the probability distribution of the second cost assessment value.

In step S800, the second output unit 420 deduces a probability distribution of a cost index by dividing the reference cost assessment value stored in the second storage unit 120 by the probability distribution of the calculated life cycle cost assessment value, and outputs the deduced probability distribution of the cost index.

Meanwhile, in step S900, a reference social impact assessment value of the reference building, a social impact coefficient group obtained by digitizing a social impact degree per input unit of the plurality of building materials may be stored in the third storage unit 130.

Then, in step S1000, the third arithmetic unit 330 calculates, by using Monte Carlo simulation, a probability distribution of a life cycle social impact assessment value by using the probability distribution of the amount of input of the plurality of building materials which is input from the probability distribution calculation unit 220 and the social impact coefficient group stored in the third storage unit 130.

In step S1100, the third output unit 430 deduces a probability distribution of a social impact index by dividing the calculated probability distribution of the life cycle social impact assessment value by the reference social impact assessment value stored in the third storage unit 130, and outputs the deduced probability distribution of the social impact index.

In step S1200, the probability distribution output unit 500 may deduce, by using Monte Carlo simulation, a probability distribution (P-SBI) of a sustainable building index by applying the probability distribution (P-EI) of the environmental impact index which is provided from the first output unit 410, the probability distribution (P-CI) of the cost index which is provided form the second output unit 420, and the probability distribution (P-SI) of the social impact index which is provided from the third output unit 430 to the above Formula 17, and output the deduced probability distribution of the sustainable building index to a display device of a user.

The building life cycle sustainability assessment method using the probabilistic analysis method of the present invention may be implemented in a program and stored in a computer readable recording medium (CD-ROM, RAM, ROM, floppy disk, hard disk, magneto-optical disc, etc).

It is further understood by those skilled in the art that the foregoing description is a preferred embodiment of the disclosed device and that various changes and modifications may be made in the invention without departing from the spirit and scope thereof.

The invention claimed is:

1. A building life cycle sustainability assessment device using a probabilistic analysis method, the device comprising:
   a first non-transitory computer readable medium storing a reference environmental impact assessment value of a reference building, a first environmental impact coefficient group obtained by digitizing an environmental impact degree per input unit of a plurality of building materials, and a second environmental impact coefficient group obtained by digitizing an environmental impact degree per consumption unit of a plurality of energy sources;
   an input unit for receiving area information of a building, an amount of input of the plurality of building materials, and an amount of consumption of the plurality of energy sources;
   a probability distribution calculating unit configured to store a set value of a form of a probability distribution of the building material and the energy source according to the area information of the building, and for the amount of input of the plurality of building materials and the amount of consumption of the plurality of energy sources, deduce a probability distribution of the amount of input of the plurality of building materials and a probability distribution of the amount of consumption of the plurality of energy sources according to the set value;
   a first arithmetic unit configured to calculate, through Monte Carlo simulation, a probability distribution of a first environmental impact assessment value by the building material by using the probability distribution of the amount of input of the plurality of building materials and the first environmental impact coefficient group, calculate a probability distribution of a second environmental impact assessment value by the energy source by using the probability distribution of the amount of consumption of the plurality of energy sources and the second environmental impact coefficient group, and calculate a probability distribution of a life cycle environmental impact assessment value by adding the probability distribution of the first environmental impact assessment value and the probability distribution of the second environmental impact assessment value; and
   a first output unit configured to deduce a probability distribution of an environmental impact index by dividing the reference environmental impact assessment value stored in the first non-transitory computer readable medium by the probability distribution of the life cycle environmental impact assessment value which is calculated in the first arithmetic unit, and output the deduced probability distribution of the environmental impact index,
   wherein the probability distribution of the environmental impact index is used to reduce risk during decision making at an initial stage of a building project.

2. The device of claim 1, further comprising:
   a second non-transitory computer readable medium storing a reference cost assessment value of the reference building, a first cost coefficient group obtained by digitizing a required cost degree per input unit of the plurality of building materials, and a second cost coefficient group obtained by digitizing a cost expense degree per consumption unit of the plurality of energy sources;
   a second arithmetic unit configured to calculate, through Monte Carlo simulation, a probability distribution of a first cost assessment value by the building material by using the probability distribution of the amount of input of the plurality of building materials and the first cost coefficient group, calculate a probability distribution of a second cost assessment value by the energy source by using the probability distribution of the amount of consumption of the plurality of energy sources and the second cost coefficient group, and calculate a probability distribution of a life cycle cost assessment value by adding the probability distribution of the first cost assessment value and the probability distribution of the second cost assessment value; and
   a second output unit configured to deduce a probability distribution of a cost index by dividing the reference cost assessment value stored in the second non-transitory computer readable medium by the probability distribution of the life cycle cost assessment value calculated in the second arithmetic unit, and output the deduced probability distribution of the cost index.

3. The device of claim 2, further comprising:
   a third non-transitory computer readable medium storing a reference social impact assessment value of the reference building, and a social impact coefficient group obtained by digitizing a social impact degree per input unit of the plurality of building materials;
   a third arithmetic unit configured to calculate, through Monte Carlo simulation, a probability distribution of a life cycle social impact assessment value by using the probability distribution of the amount of input of the plurality of building materials and the social impact coefficient group; and a third output unit configured to deduce a probability distribution of a social impact index by dividing the probability distribution of the life cycle social impact assessment value calculated in the third arithmetic unit by the reference social impact assessment value stored in the third non-transitory computer readable medium, and output the deduced probability distribution of the social impact index.

4. The device of claim 3, further comprising a probability distribution outputting unit configured to deduce a probability distribution of a sustainable building index through Monte Carlo simulation and P-SBI=$\alpha$P-EI+$\beta$P-CI+$\gamma$P-SI, wherein P-SBI is a probability distribution of the sustainable building index, P-EI is the probability distribution of the environmental impact index, P-CI is the probability distribution of the cost index, P-SI is the probability distribution of the social impact index, and $\alpha$, $\beta$, and $\gamma$ are weighting factors which are set as 1=$\alpha$+$\beta$+$\gamma$, and output the deduced probability distribution of the sustainable building index.

5. A building life cycle sustainability assessment method using a probabilistic analysis method, the method comprising:

step (a) storing a reference environmental impact assessment value of a reference building, a first environmental impact coefficient group obtained by digitizing an environmental impact degree per input unit of a plurality of building materials, and a second environmental impact coefficient group obtained by digitizing an environmental impact degree per consumption unit of a plurality of energy sources;

step (b) receiving area information of a building, an amount of input of the plurality of building materials, and an amount of consumption of the plurality of energy sources;

step (c) for the amount of input of the plurality of building materials and the amount of consumption of the plurality of energy sources, deducing a probability distribution of the amount of input of the plurality of building materials and a probability distribution of the amount of consumption of the plurality of energy sources according to a set value stored in advance on a form of a probability distribution of the building material and the energy source according to the area information of the building;

step (d) calculating, through Monte Carlo simulation, a probability distribution of a first environmental impact assessment value by the building material by using the probability distribution of the amount of input of the plurality of building materials and the first environmental impact coefficient group, calculating a probability distribution of a second environmental impact assessment value by the energy source by using the probability distribution of the amount of consumption of the plurality of energy sources and the second environmental impact coefficient group, and calculating a probability distribution of a life cycle environmental impact assessment value by adding the probability distribution of the first environmental impact assessment value and the probability distribution of the second environmental impact assessment value; and step (e) deducing a probability distribution of an environmental impact index by dividing the reference environmental impact assessment value by the probability distribution of the life cycle environmental impact assessment value which is calculated in the step (d), and outputting the deduced probability distribution of the environmental impact index, wherein the probability distribution of the environmental impact index is used to reduce risk during decision making at an initial stage of a building project.

6. The method of claim 5, further comprising:

step (f) storing a reference cost assessment value of the reference building, a first cost coefficient group obtained by digitizing a required cost degree per input unit of the plurality of building materials, and a second cost coefficient group obtained by digitizing a required cost degree per consumption unit of the plurality of energy sources;

step (g) calculating, through Monte Carlo simulation, a probability distribution of a first cost assessment value by the building material by using the probability distribution of the amount of input of the plurality of building materials and the first cost coefficient group, calculating a probability distribution of a second cost assessment value by the energy source by using the probability distribution of the amount of consumption of the plurality of energy sources and the second cost coefficient group, and calculating a probability distribution of a life cycle cost assessment value by adding the probability distribution of the first cost assessment value and the probability distribution of the second cost assessment value; and step (h) deducing a probability distribution of a cost index by dividing the reference cost assessment value by the probability distribution of the life cycle cost assessment value calculated in the step (g), and outputting the deduced probability distribution of the cost index.

7. The method of claim 6, further comprising:

step (i) storing a reference social impact assessment value of the reference building, and a social impact coefficient group obtained by digitizing a social impact degree per input unit of the plurality of building materials;

step (j) calculating, through Monte Carlo simulation, a probability distribution of a life cycle social impact assessment value by using the probability distribution of the amount of input of the plurality of building materials and the social impact coefficient group; and step (k) deducing a probability distribution of a social impact index by dividing the probability distribution of the life cycle social impact assessment value calculated in the step (j) by the reference social impact assessment value, and outputting the deduced probability distribution of the social impact index.

8. The method of claim 7, further comprising:

step (1) deducing a probability distribution of a sustainable building index through Monte Carlo simulation and P-SBI=$\alpha$P-EI+$\beta$P-CI+$\gamma$P-SI, wherein P-SBI is a probability distribution of the sustainable building index, P-EI is the probability distribution of the environmental impact index, P-CI is the probability distribution of the cost index, P-SI is the probability distribution of the social impact index, and $\alpha$, $\beta$, and $\gamma$ are weighting factors which are set as 1=$\alpha$+$\beta$+$\gamma$, and outputting the deduced probability distribution of the sustainable building index.

9. A non-transitory computer readable recording medium storing a program executing a building life cycle sustainability assessment method using a probabilistic analysis method of claim 5.

* * * * *